US012657155B2

(12) United States Patent
Charif et al.

(10) Patent No.: US 12,657,155 B2
(45) Date of Patent: Jun. 16, 2026

(54) SYSTEM AND METHOD FOR GENERATION OF NETWORKS-ON-CHIP (NoCs)

(71) Applicant: ARTERIS, INC., Campbell, CA (US)

(72) Inventors: Amir Charif, Paris (FR); Xavier Van Ruymbeke, Montigny-le-bretonneux (FR)

(73) Assignee: ARTERIS, INC., Campbell, CA (US)

( * ) Notice: Subject to any disclaimer, the term of this patent is extended or adjusted under 35 U.S.C. 154(b) by 76 days.

(21) Appl. No.: 18/907,582

(22) Filed: Oct. 6, 2024

(65) Prior Publication Data

US 2025/0117355 A1　　Apr. 10, 2025

Related U.S. Application Data

(60) Provisional application No. 63/542,552, filed on Oct. 5, 2023.

(51) Int. Cl.
| | |
|---|---|
| *G06F 30/39* | (2020.01) |
| *G06F 15/78* | (2006.01) |
| *G06F 30/327* | (2020.01) |
| *H04L 41/14* | (2022.01) |
| *G06F 115/02* | (2020.01) |

(52) U.S. Cl.
CPC ........ G06F 15/7825 (2013.01); H04L 41/145 (2013.01); *G06F 2115/02* (2020.01)

(58) Field of Classification Search
None
See application file for complete search history.

(56) References Cited

U.S. PATENT DOCUMENTS

| | | | | |
|---|---|---|---|---|
| 10,708,152 B2 * | 7/2020 | Kulshreshtha | ........ | H04L 41/145 |
| 11,128,700 B2 * | 9/2021 | Rao | ..................... | H04L 67/1031 |
| 2018/0197110 A1 * | 7/2018 | Rao | ........................ | G06F 30/398 |
| 2018/0203963 A1 * | 7/2018 | Eghbal | ............... | G06F 30/3308 |
| 2019/0258251 A1 * | 8/2019 | Ditty | .................... | G05D 1/0088 |
| 2021/0320869 A1 * | 10/2021 | Bourai | ................. | H04L 47/125 |
| 2021/0409284 A1 * | 12/2021 | Cherif | .................... | H04W 40/32 |
| 2022/0188490 A1 * | 6/2022 | Cherif | ................... | G06F 30/394 |
| 2022/0232111 A1 * | 7/2022 | Ford | ..................... | H04L 47/22 |
| 2022/0382615 A1 * | 12/2022 | Turk | .................... | G06F 11/079 |

* cited by examiner

*Primary Examiner* — Christopher B Robinson
(74) *Attorney, Agent, or Firm* — Jubin Dana; Dana Legal Services

(57) ABSTRACT

System and methods are disclosed that are implemented by a tool for generation and synthesis of networks, such as a network-on-chip (NoC). The tool receives input from the user, either as a data file or through input in a graphical user interface (display). The tool generates a NoC from a set of physical constraints and performance constraints. The tool produces the NoC with all its elements, which is a legal and meets the constraints. The tool also receives as an input performance scenarios or performance requirement that can be used to transform an existing topology to satisfy the newly added requirements. The resulting output represents the network, such as the NoC, that meets the requirements.

6 Claims, 36 Drawing Sheets

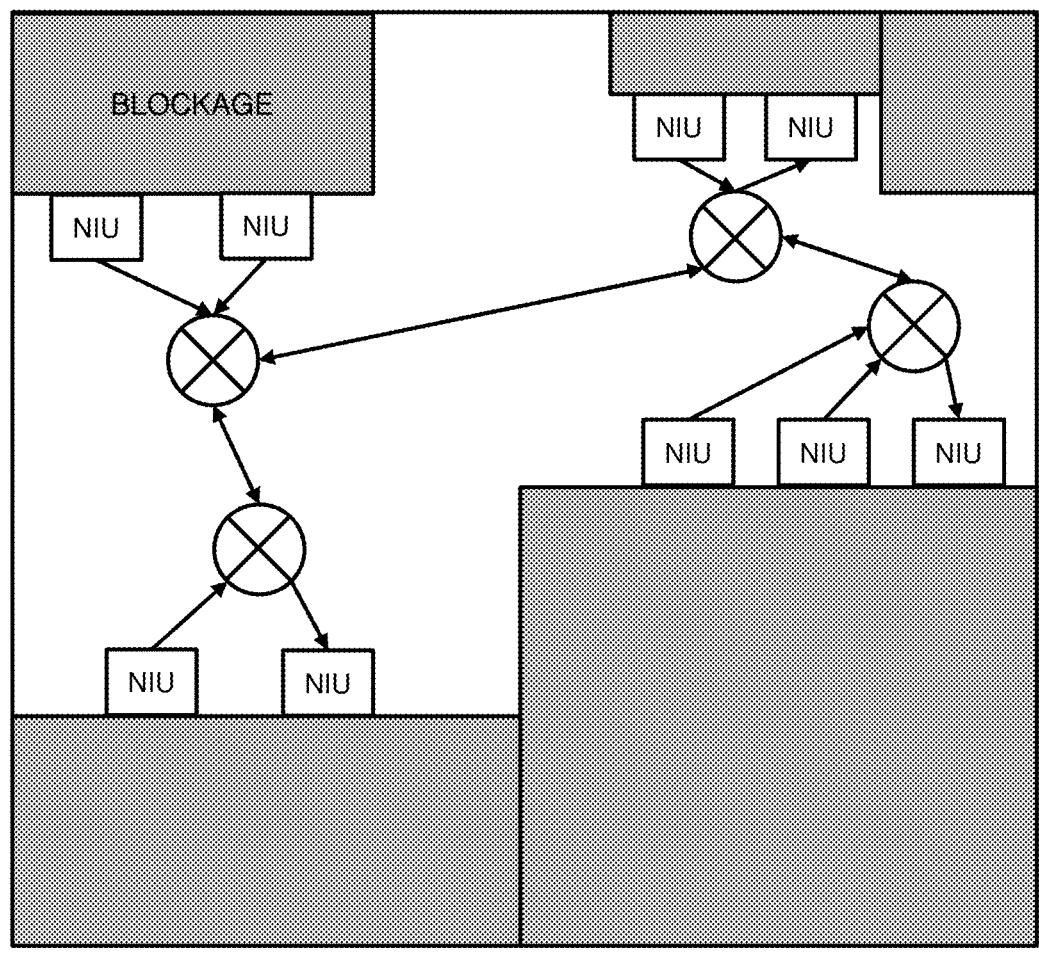
FIG. 1B

300

600

- 3 master NIUs

- 5 target NIUs

- 3 traffic class labels:
  - BE
  - LL
  - BW

- Hence 3 main switches

- Connectivity + labels:

902
800
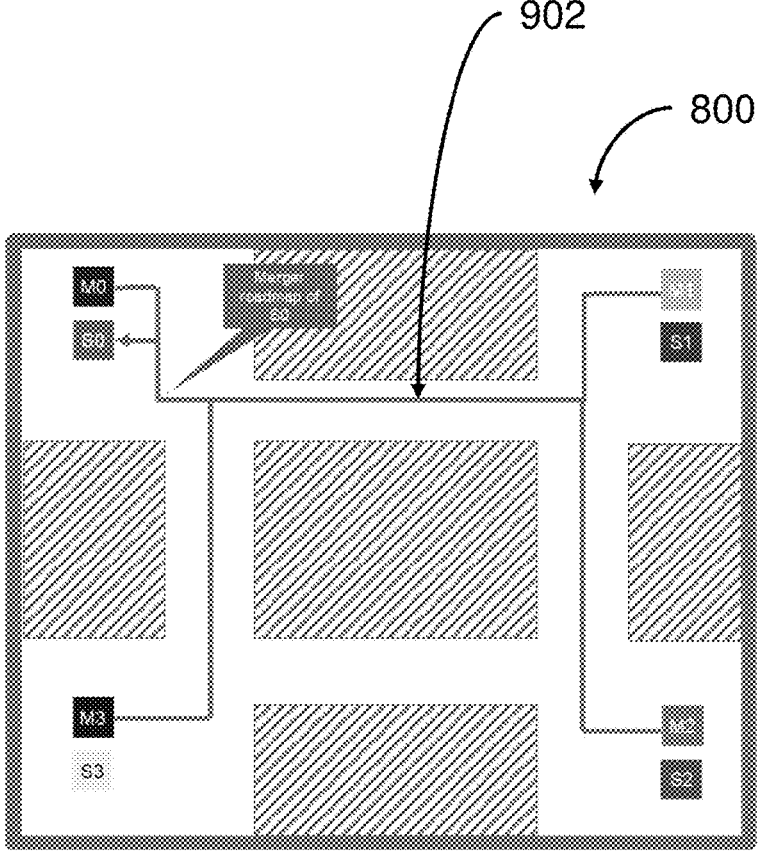
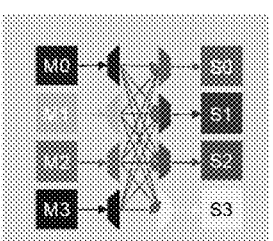
FIG. 9

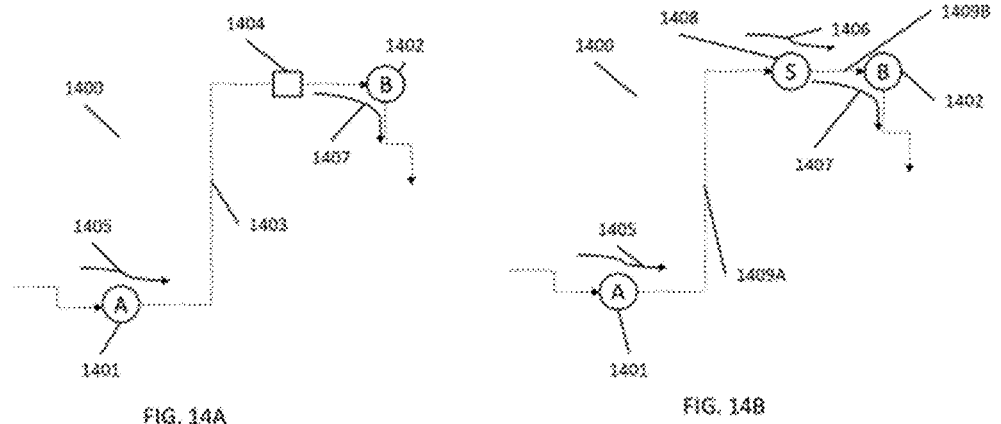
FIG. 14A                    FIG. 14B

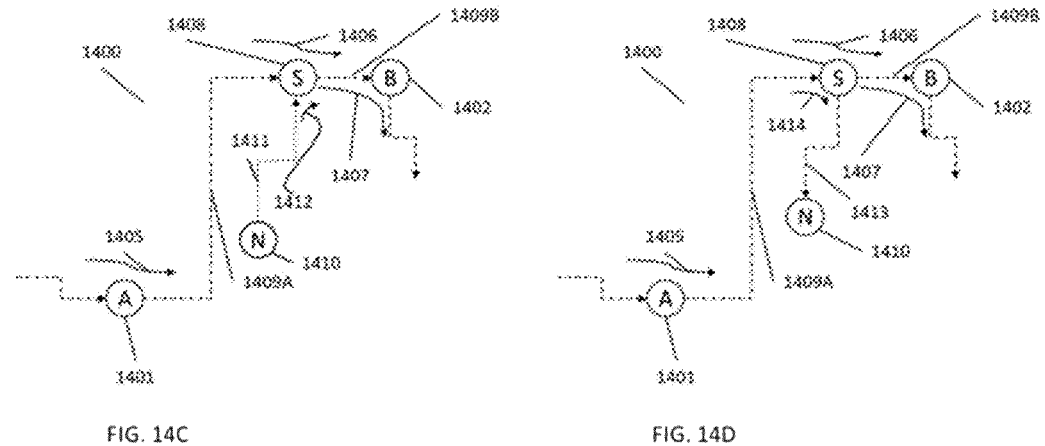
FIG. 14C                    FIG. 14D

FIG. 17A                    FIG. 17B
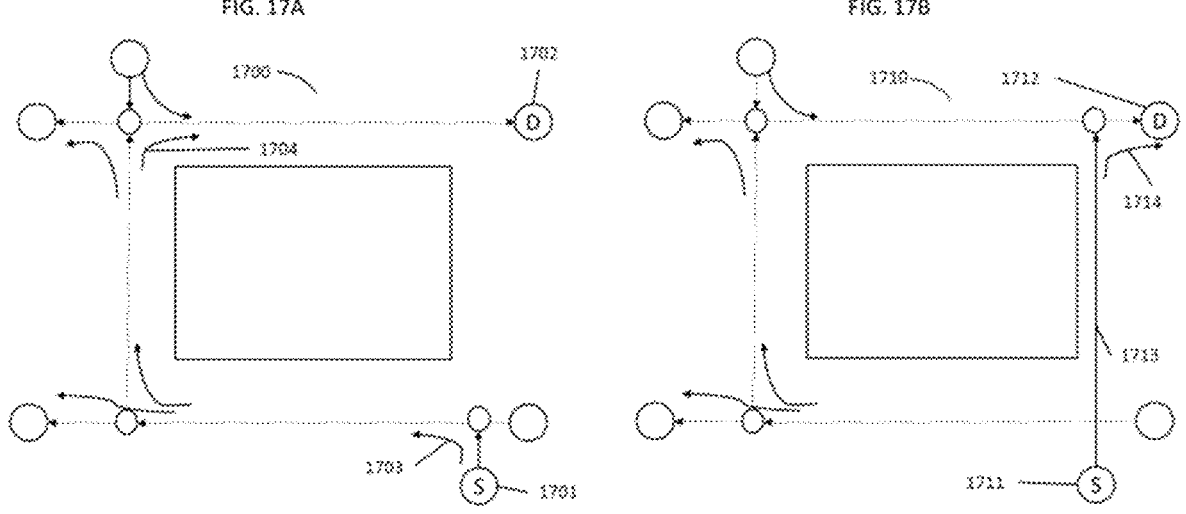

Scenario 1

| Source | Target | Speed | Mode | Addr Bytes |
|--------|--------|-------|------|------------|
| CPU | VRAM | 100MB/s | WRITE | 64 |
| CAM | ENET | 50MB/s | WRITE | 16 |

Scenario 2

| Source | Target | Speed | Mode | Addr Bytes |
|--------|--------|-------|------|------------|
| CPU | DRAM | 100MB/s | READ | 64 |
| DMA | DRAM | 200MB/s | READ | 32 |

Fastest clock in the design: 1Ghz
Design data width: 4 bytes

Fastest clock in the design: 1Ghz
Design data width: 4 bytes

Fastest clock in the design: 1Ghz
Design data width: 4 bytes

3100

3110

SYSTEM AND METHOD FOR GENERATION OF NETWORKS-ON-CHIP (NoCs)

CROSS REFERENCE TO RELATED APPLICATIONS

The application claims the priority benefit of U.S. Provisional Application Ser. No. 63/542,552 filed on Oct. 4, 2023 by Amir CHARIF, et al and titled SYSTEM AND METHOD FOR GENERATION OF NETWORKS-ON-CHIP (NoC), the entire disclosure of which is incorporated herein by reference.

TECHNICAL FIELD

The present technology is in the field of electronic design tool and, more specifically, related to generation of a network-on-chip (NoC).

BACKGROUND

Multiprocessor systems have been implemented in systems-on-chip (SoCs) that communicate through one or more networks-on-chip (NoCs). The SoCs include instances of intellectual properties (IPs) that communicate using a NoC. Example of IPs include initiators and targets. Initiators send data, which can be a transaction, to targets. Transactions, in the form of packets, are sent from an initiator to one or more targets using industry-standard protocols. The initiator, connected to the NoC through a network interface unit (NIU), sends a request transaction to a target, using an address to select the target. The NoC decodes the address and transports the request from the initiator to the target. The target handles the transaction and sends a response transaction, which is transported back by the NoC to the initiator. A NoC is an example for designing scalable communication architecture for SoCs. It is more desirable to eliminate the conditions that result in a deadlock in a network when using NoCs in design applications. It is currently known to route messages through an array of data processing nodes to facilitate a plurality of paths directed to a destination without the occurrence of a message delayed by a routing deadlock. An important aspect when designing application-specific NoCs is a more desirable deadlock-free operation with the use of minimum power and area overhead. There are two main types of deadlocks that are known to occur in NoCs. The first type of deadlock is a routing dependent deadlock. The second type of deadlock is a message-dependent deadlock.

For a given set of performance requirements, such as connectivity and latency between source and destination, frequency of the various elements, maximum area available for the NoC logic, minimum throughput between sources and destinations, position on the floorplan of elements attached to the NoC, it is a complex task to create an optimal NoC that fulfills all the requirements with a minimum amount of logic and wires. This is typically the job of the chip architect or chip designer to create this optimal NoC, and this is a difficult and time-consuming task. In addition to this being a difficult task, the design of the NoC is usually revised every time one of the requirement changes, such as modifications of the chip floorplan or modifications that impact expected performance. As a result, this task needs to be redone frequently over the design time of the chip. This process is time consuming, which results in production delays. Therefore, what is needed is system and method to efficiently generate a NoC from a set of constraints, which are listed as requirements, and a set of element inputs. The system needs to produce the NoC that meets the constraints and with all its elements placed on a floorplan of a chip.

A current problem exists during NoC synthesis of new connections in an existing NoC, because it is challenging to reuse the existing topology and the production costs associated with the wiring are costly. One problem that exists is verifying that an existing NoC provides enough bandwidth to accommodate a number of communication scenarios given as input. Another problem is the lack of tools that can automatically configure a NoC in an optimal way to ensure it has enough bandwidth to accommodate a number of communication scenarios, which can be given as input.

Another problem exists when a NoC topology is synthesized (even with knowledge of all of the performance scenarios at the beginning), the configuration process is not guaranteed to find a solution to support running a number of user-provided performance scenarios. A newly created NoC (generated by topology synthesis, or created by hand) may not support the load generated by the scenarios.

Another problem exists, when a designer provides performance requirements to the NoC generation tool or topology synthesis process by defining a set of scenarios, which are a set of communications taking place in parallel at a given speed, to drive the shape of the topology using performance constraints, it is difficult and time-consuming to define and very difficult to input all of the scenarios that are required to obtain a certain traffic distribution.

Another problem that arises when performing an environmental NoC synthesis occurs after a change in the specification. For example, when new connections are added, a previous result is overwritten. Thus, there is a need for a method for designing a NoC that avoids both routing dependent deadlocks and message-dependent deadlocks and are integrated with the topology synthesis phase of the NoC design flow. Considering the deadlock avoidance issue during topology synthesis, a more desirable NoC design may be achieved compared to traditional methods, where the deadlock avoidance issue is managed with separately. Further, there is a need for new connections to be added without overwriting a previous result.

SUMMARY

In accordance with various embodiments and aspects of the invention, systems and methods are disclosed that generate a network-on-chip (NoC) using a set of constraints and inputs to produce or generate the NoC with all of its elements that meet the defined constraints while avoiding deadlocks. The elements of the NoC are placed on a floorplan of a chip. An advantage of the invention is simplification of the design process and the work of the chip architect or designer. Another advantage is the NoC generation or synthesis method having an incremental design, whereby, the NoC is generated or synthesized one connection at a time. In particular, a set of nodes of a source-destination pair and each new connection is synthesized by taking the set of existing connections as an input. New components including, but not limited to, switches and/or links may be created when synthesizing a new connection to define a network route from a source to a destination. It is within the scope of this invention for a destination to include, but not be limited to, being a list of components to be traversed. Further, configuring the newly created components including, but not limited to a clock and/or data width is an important aspect when synthesizing a new connection.

BRIEF DESCRIPTION OF THE DRAWINGS

FIG. 1B shows a NoC with elements placed on a floorplan of a network;

FIG. 9 shows a roadmap in a floorplan for one target of the network of FIG. 6 in accordance with the various aspects and embodiments of the invention;

FIG. 14A illustrates a NoC topology over a floorplan having a segment "S" to "D" being split in accordance with the various aspects and embodiments of the invention;

FIG. 14B illustrates a NoC topology over a floorplan having the split segment "S" to "D" updated to use two new sub-segments "S" to "N" and "N" to "D" in accordance with the various aspects and embodiments of the invention;

FIG. 14C illustrates a NoC topology over a floorplan having a sub-segments "N" and "S" being merged into the split segment in accordance with the various aspects and embodiments of the invention;

FIG. 14D illustrates a NoC topology over a floorplan having a sub-segments represented by a channel between node "N" and node "S" being forked out into the split segment in accordance with the various aspects and embodiments of the invention;

FIG. 17A illustrates a NoC topology over a floorplan having a communication policy 1700 being to optimize wire length with a best effort performance in accordance with the various aspects and embodiments of the invention;

FIG. 17B illustrates a NoC topology over a floorplan having a communication policy 1710 being to a low latency communication in accordance with the various aspects and embodiments of the invention;

DETAILED DESCRIPTION

Figure 1A:
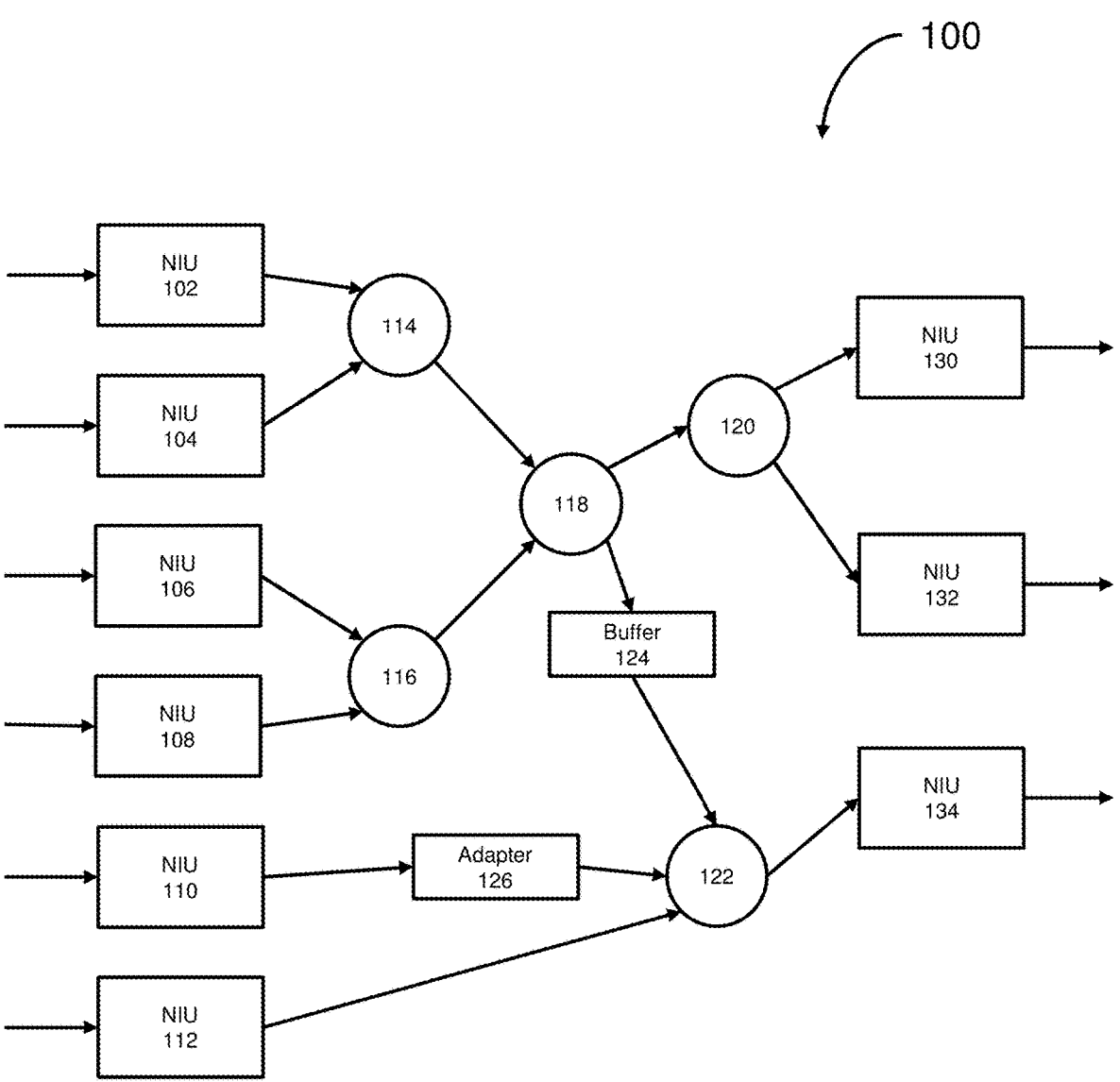
FIG. 1A shows a logic view of a network-on-chip (NoC) that includes various elements that create the NoC.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in accordance with one or more embodiments," "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future.

As used herein, an "initiator" refers to similar intellectual property (IP) modules or units and the terms are used interchangeably within the scope and embodiments of the invention. As used herein, a "target" refers to similar IP modules or units and the terms are used interchangeably within the scope and embodiments of the invention. As used herein, a transaction may be a request transaction or a response transaction. Non-limiting examples of request transactions include write request and read request.

As used herein, a node is defined as a distribution point and/or a communication endpoint that is capable of creating, receiving, and/or transmitting information over a communication path or channel. A node may refer to any one of the following: switches, splitters, mergers, buffers, and adapters. As used herein, splitters and mergers are switches; not all switches are splitters or mergers. As used herein and in accordance with the various aspects and embodiments of the invention, the term "splitter" describes a switch that has a single ingress port and multiple egress ports. As used herein and in accordance with the various aspects and embodiments of the invention, the term "merger" describes a switch that has a single egress port and multiple ingress ports.

In an embodiment, the set of existing connections may by empty. As a result, the NoC will be synthesized from the beginning of the process without an existing connection.

The order in which connections are implemented affects the quality of the topology. In an embodiment, the order may be determined based on a plurality of mathematical optimization techniques and/or heuristics. For example, the order may be determined by the area of the floorplan spanned by the connections. In another example, the order may be a latency based communication policy configured to measure delays in a packet's arrival at the destination and implements the more sensitive connections at a higher priority. It is within the scope of this invention for the synthesis order to be an input to the method for deterministic and incremental physically-aware NoC topology synthesis.

The system configured for automatically generating or synthesizing a deadlock-free NoC from a specification includes: a floorplan, being a physical layout of the chip; technological parameters including, but not limited to, wire delay and/or logic density; floorplan regions including, but not limited to, modules and/or clock limits; a clock domain crossing (CDC) being the traversal of a signal in a synchronous digital circuit from a first clock domain into a second clock domain; performance requirements; and a component having a configuration and location on the floorplan, connectivity requirements between a first component and a second component, and a communication policy between the first component and the second component.

A method of transforming an existing deadlock-free network-on-chip (NoC) configuration, the existing deadlock-free network-on-chip configuration including of a plurality of existing physical segments and a set of existing turns that are allowable between segments, the plurality of existing physical segments and the set of existing turns forming a plurality of existing routes. The method includes generating a new NoC configuration by generating and/or synthesizing at least a first new connection into the existing deadlock-free network-on-chip configuration, the first new connection having a source and a destination, the generating creating a first new deadlock free route from the source to the destination, whereby the new network-on-chip configuration is deadlock free, and wherein the generating a first new deadlock-free route from the source to the destination preserves existing routes.

The generating including: for each existing route, translating the route into segments and turns; identifying one or more new connections to be synthesized, each of the plurality of new connections having undefined routes, a source, and a destination associated therewith, the one or more new connections being identified together with a synthesis order; for each of the one or more new connections and in accordance with sorting, identifying a plurality of possible routes from the source to the destination for the new connection.

The possible route includes of one or more of: a new entry segment connecting the source to the existing deadlock-free NoC configuration; a new exit segment connecting the existing deadlock-free network-on-chip configuration to the destination; one or more new internal segments connecting existing segments of the existing deadlock-free network-on-chip configuration, whereby the one or more new internal segments connect the source to the destination, wherein a new internal segment is not considered if it would create a cyclic dependency among segments, thereby causing a deadlock; and existing segments only.

Filtering the plurality of possible routes based on one or more criteria, which includes: a communication policy criteria based on allowed latency of the route from the source to the destination of the new connection; any of a plurality of user-defined criteria; selecting one of the plurality of possible routes for synthesis; and/or synthesizing the selected possible route into the existing deadlock-free network-on-chip configuration.

In accordance with one or more embodiments of the invention, the first new deadlock free route includes at least one of an existing physical segment and a new physical segment.

In accordance with one or more embodiments of the invention, the generating a first new deadlock-free route from the source to the destination preserves all existing routes.

In accordance with one or more embodiments of the invention, incrementally repeating the generating of new deadlock free routes.

In accordance with one or more embodiments of the invention, identifying a synthesis order includes sorting the one or more new connections in accordance with a heuristic.

In accordance with one or more embodiments of the invention, at least a portion of the existing segment is physically immutable.

In accordance with one or more embodiments of the invention, an endpoint of at least a portion of an existing segment is a switch. The switch is physically immutable.

In accordance with one or more embodiments of the invention, any component is logically mutable causing at least one existing component being reconfigured in response to a new resulting topology.

In accordance with one or more embodiments of the invention, selecting one of the plurality of possible routes for synthesis includes selecting the possible route that maximizes use of the existing deadlock-free network-on-chip configuration, wherein existing segments are made physically immutable, with an exception of an entry and an exit segment, a switch is made physically immutable, and at least one network element is made logically immutable.

In accordance with one or more embodiments of the invention, selecting one of the plurality of possible routes for synthesis includes selecting the possible route that minimizes latency of the route.

In accordance with one or more embodiments of the invention, selecting one of the plurality of possible routes for synthesis includes selecting the possible route that maximizes use of the existing deadlock-free network-on-chip configuration, wherein existing segments are not made physically immutable, switches are allowed to have new connections, and existing network elements are made logically immutable, which includes keeping clock frequencies and other attributes unchanged.

In accordance with one or more embodiments of the invention, selecting one of the plurality of possible routes for synthesis includes selecting while existing segments are not made physically immutable, switches are allowed to have new connections, and existing network elements are reconfigurable.

A method for incremental synthesis and transformation of a deadlock-free network-on-chip topology includes receiving an input being a network topology. The network topology is translated into an existing segment; reusing the existing segment in a new route, the existing segment is formed by a path between a first node and a second node; splitting the existing segment recursively at any geographical point along the path between the first node and the second node to form a split segment; responsive to the splitting, synthesizing the new route by adding a new segment and a new turn to the split segment; and generating the deadlock-free network-on-chip topology by routing a packet from the turn of the existing segment to the new segment, thereby, avoiding a deadlock in the network.

In accordance with one or more embodiments of the invention, identifying a synthesis order including sorting the one or more new connections in accordance with a heuristic.

In accordance with one or more embodiments of the invention, at least a portion of the existing segment is physically immutable.

In accordance with one or more embodiments of the invention, an endpoint of the at least a portion of the existing segment is a switch. The switch is physically immutable.

In accordance with one or more embodiments of the invention, any component is logically mutable causing at least one existing component being reconfigured in response to a new resulting topology.

A non-transitory computer readable medium for storing code, which when executed by one or more processors, would cause the processor to: receiving an input topology of a network-on-chip (NoC) to determine a source-destination pair to be selected for synthesis and at least one existing connection; transcribing the source-destination pair into a pair of segments; transcribing the at least one existing connection into a pair of existing segments; determining if the NoC is deadlock-free; responsive to determining, if the NoC is the deadlock-free, extracting the pair of segments that do not have defined routes and sort them using a heuristic; inputting the pair of segments and the pair of existing segments into a configuration explorer, the configuration explorer determining a configuration for routing from a source to a destination of the source-destination pair, using a communication policy, the communication policy is configured to receive user defined parameters associated with the source-destination pair, the communication policy is in communication with a configuration filtering module, the configuration filtering module configured to output eligible configurations; selecting, using a configuration selection module, a final configuration to be implemented for connecting the source-destination pair; splitting the pair of existing segments that need to be connected to the pair of segments at a point dictated by the final configuration; creating a new segment dictated by the final configuration; activating corresponding turns connecting the pair of existing segments with the pair of segments; and computing the route from the source to the destination of the source-destination pair.

Referring now to FIG. 1A, a network-on-chip (NoC) 100 is shown in accordance with various aspects and embodiments of the invention. The NoC 100 is one example of a network. In accordance with various aspects and embodiments of the invention, a network includes a set of nodes and set of edges, each of these has a model and can be used at the heart of the synthesis to perform and implement transformation over the network and converge to the best solution fitting the specified requirements. The NoC 100 includes nodes and endpoints and uses elementary network functions that are assembled, such as: network interface units (NIUs) 102, 104, 106, 108, 110, 112, 130, 132, and 134, nodes/ switches 114, 116, 118, 120, and 122; adapters, such as adapter 126; and buffers, such as buffer 124. The NoC elementary network functions use an internal transport protocol, which is specific to the NoC 100, to communicate with each other, typically based on the transmission of packets. The NIUs convert the protocol used by the attached system-on-chip (SoC) unit (not shown), into the transport protocol used inside the NoC 100. The switches route flows of traffic between source and destinations. The buffer 124 is used to insert pipelining elements to span long distances, or to store packets to deal with rate adaptation between fast senders and slow receivers or vice-versa. The adapter 126 handles various conversions between data width, clock and power domains.

Referring now to FIG. 1B, a NoC 150 is shown with various elements, such as NIUs, switches, and blockage areas in the floorplan. The NoC 150 includes various connectivity elements through various switches. In accordance with one aspect of the invention, a set of constraints are used as input to the tool, which is discussed in greater detail below. In accordance with some aspects of the invention, the tool executes a set of sub-steps and produces the description (synthesis) of a resulting NoC, such as the NoC 150, with its configured elements and the position of each element on the floorplan. The generated description is used to actually implement the NoC hardware, using the physical information produced to provide guidance to the back-end implementation flow.

Figure 2A:
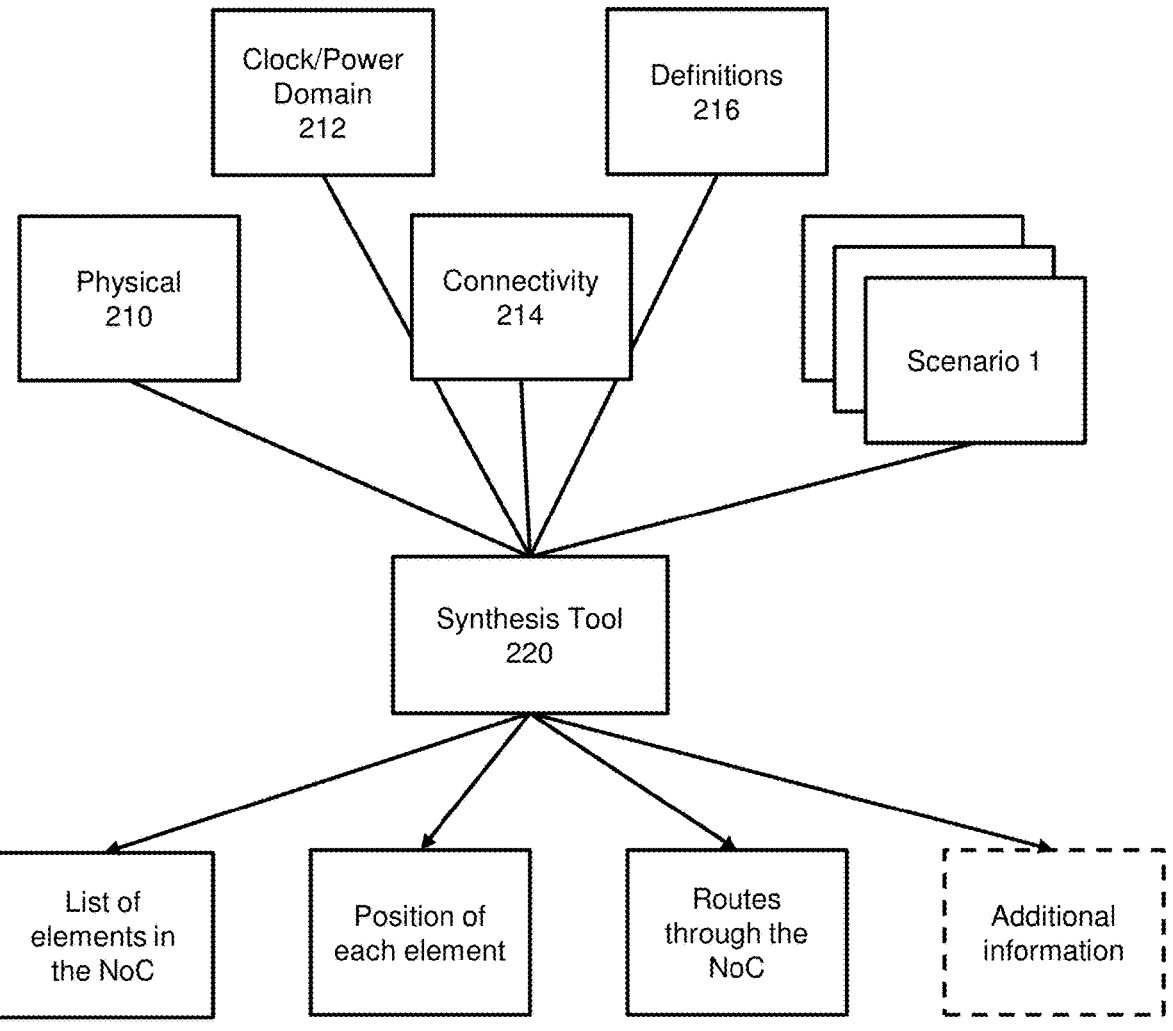
FIG. 2A shows a method for generating a NoC description based on a set of constraints in accordance with various aspects and embodiments of the invention.

Referring now to FIG. 2A, in accordance with some aspects of the invention, a set of constraints (210, 212, 214, 216, and Scenarios) are provided to a synthesis tool 220. In accordance with some embodiments and aspects of the invention, the performance and function of the tool 220 may include third-party ASIC implementation tools such as logic synthesis, place and route back end tools, and so on. A designer or user builds the set of constraints that are provide to the tool 220. The constraints are captured in machine-readable form, such as computer files using a defined format to capture information, that is understood and processed by the tool. In accordance with one aspect of the invention the format is XML. In accordance with another aspect of the invention the format is JSON. The scope of the invention is not limited by the specific format used.

Figure 2B:
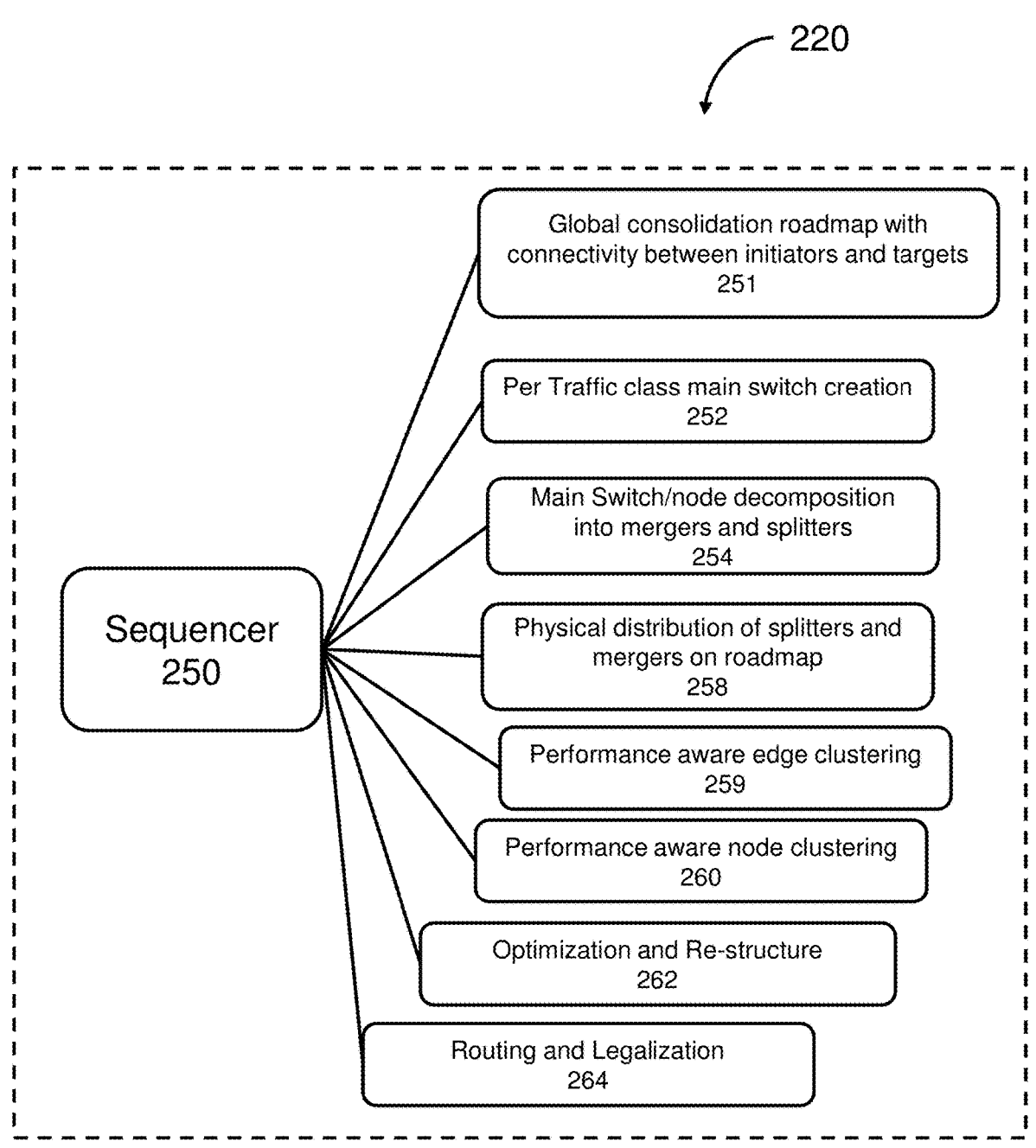
FIG. 2B shows a block diagram of a NoC synthesis tool in accordance with various aspects and embodiments of the invention.

Referring now to FIG. 2B, the tool reads the files containing the description of the constraints and executes the synthesis process. In accordance with some aspects of the invention, the synthesis process is broken down into multiple steps. A sequencer 250 is responsible for executing each step of the process. In accordance with some aspects of the invention, a set of steps are executed by the sequencer 250 of the tool 220 in light of the constraints set forth by the user/designer. The scope of the invention is not limited by the number and kind of steps the sequencer 250 may call and execute.

Referring again to FIG. 2A along with FIG. 2B, in accordance with the various aspects of the invention, the designer of the network provided and defines a set of constraints, such as constraints 210, 212, 214, and 216. A sequencer 250 receives various inputs, including: input 251 that includes global consolidation roadmaps with connectivity between initiators and targets including roadmap creation and information between each initiator and target;

input 252 that includes traffic classification and main switch creation; input 254 that includes main switch decomposition into mergers and splitters; input 258 that includes information about physical distribution of splitters and mergers in the roadmap; input 259 that includes information about edge clustering; and input 260 that includes information about performance aware node clustering. In accordance with one aspect of the invention, the sequencer 250 also receives input 262 that includes information about optimization and network restructuring. In accordance with one aspect of the invention, the sequencer 250 receives 264 that includes information about routing and legalization. In accordance with various aspects and embodiments of the invention, the sequencer 250 uses all the inputs 251-264 to generate the network. In accordance with various aspects and embodiments of the invention, the sequencer 250 uses a combination of the inputs 251-264 to generate the network.

In accordance with the various aspects of the invention, input 251 includes input about the global consolidation roadmap. The global consolidation roadmap includes a consolidation model that captures the global physical view of the connectivity of the floorplan's free space, as well as the connectivity across/between the initiators and targets. The global consolidation roadmap is modeled by a graph of physical nodes and canonical segments that are used to position the nodes. (splitters, mergers, switches, adapters) of the network under construction. The global consolidation roadmap is used to fasten computation. In accordance with various aspects of the invention, the global consolidation roadmap is persistent, which means that it is data the system exports and re-consumes in incremental synthesis and subsequent runs.

In accordance some aspects of the invention, input 259 incudes information about edge clustering. Edge clustering aims to minimize resources and enhancing performance goals through proper algorithms and techniques. In accordance with some aspects of the invention, edge clustering is applied in conjunction and in cooperation with input 260, node clustering. Edge clustering and node clustering can be used in combination by mixing, by being applied concurrently, or by being applied in sequence. The advantage and goal is to expand the spectrum of synthesis and span a larger solution space for the network.

In accordance with various aspects of the invention, input 262 includes information about re-structuring. Re-structuring includes a variety of transformations and capabilities. In accordance with some aspects of the invention, the transformations are logical in that there is a change in structure of the network. In accordance with some aspects of the invention, the transformation are physical because there is a physical change in the network, such as moving a node to a new location. Other examples of re-structing include: breaking a node into smaller nodes; reparenting between nodes; network sub-part duplication to avoid deadlocks and to deal with congestion; and physically re-routing links to avoid congestion areas or to meet timing constraints.

Figure 3:
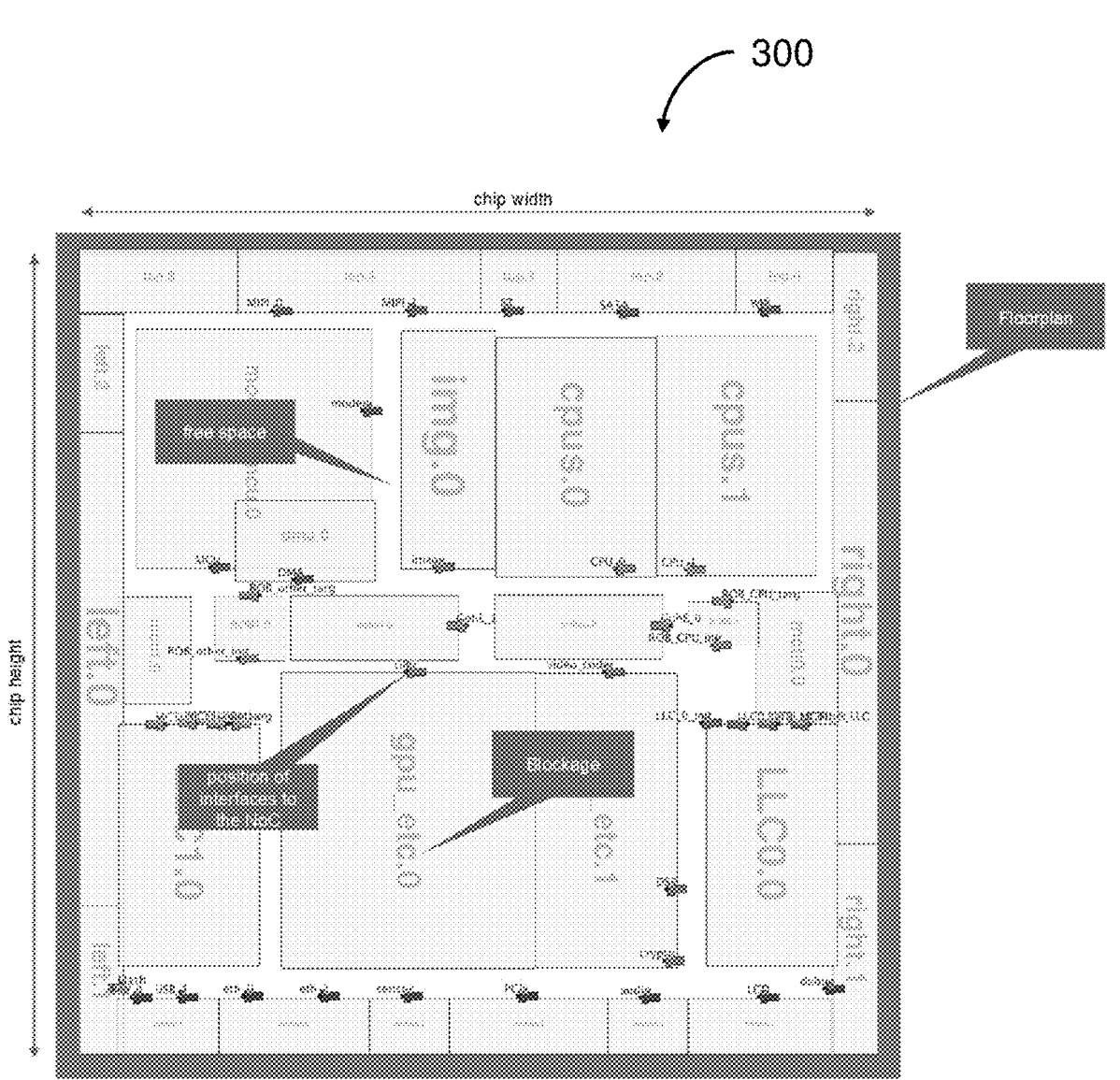
FIG. 3 shows a graphical view of the floorplan of a chip with blockage areas and positions of interface to the NoC in accordance with various aspects and embodiments of the invention.

Referring now to FIG. 3, in accordance with the various aspects of the invention, a floorplan 300 of the chip onto which the NoC is implemented is shown, with positions for various initiator interfaces and target interfaces. The physical constraint 210 provides physical information about the design that includes: the size of the chip onto which the NoC will be implemented; the various blockages areas on the floorplan, which are rectangles representing area of the chip onto which the NoC logic cannot exist or be placed; the free space, which is area of the chip where the NoC logic can exist and is defined by area not covered by a blockage; and the position of the interfaces between the SoC units and the NoC, which is the position of the initiator interfaces and the targets interfaces, such as NIUs.

In accordance with the various aspects of the invention, another constraint includes extension of the clock domain and power domain 212 can also be provided. The domain 212 includes areas of the chip where logic belonging to a particular domain is allowed to be placed.

In accordance with the various aspects of the invention, capabilities of the logic library, which will be used to implement the NoC, are provided. The information includes the size of a reference logic gate, and the time it takes for a signal to cover a 1 mm distance.

Referring again to FIG. 2A, in accordance with the various aspects of the invention, a SoC includes multiple clocks domains and multiple power domains. A clock domain is defined by all the logic fed by a given clock input. The clock input is characterized by the frequency of the clock, which is its most important parameters. A power domain is defined by all the logic getting power supply from the same power source. In accordance with the various aspects of the invention, the power source is gated, thus, the power domain can be on or off or isolated from other power domains. As such, the designer provides the set of clock domain and power domain constraints 212 as part of the initial design.

In accordance with the various aspects of the invention, initiators and targets are communicatively connected to the NoC. An initiator is a unit that send requests, typically read and write commands. A target is a unit that serves or responds to requests, typically read and writes commands. Each initiator is attached to or connected to the NoC through a NIU. The NIU that is attached to an initiator is called an Initiator Network Interface Unit (INIU). Further, each target is attached to the NoC through an NIU. The NIU that is attached to a target is called a Target Network Interface Unit (TNIU). The primary functionality of the NoC is to carry each request from an initiator to the desired destination target, and if the request demands or needs a response, then the NoC carries each target's response to the corresponding requesting initiator. Initiators and targets have many different parameters that characterize them. In accordance with the various aspects of the invention, for each initiator and target, the clock domain and power domain they belong to are defined. The width of the data bus they use to send write and receive reads payloads is a number of bits. In accordance with the various aspects of the invention, the width of the data bus for the connection (the communication path to/from a target) used to send write requests and receive write responses are also defined. Furthermore, the clock and power domain definition are a reference to the previously described clock and power domains existing in the SoC, as described herein.

Figure 4:
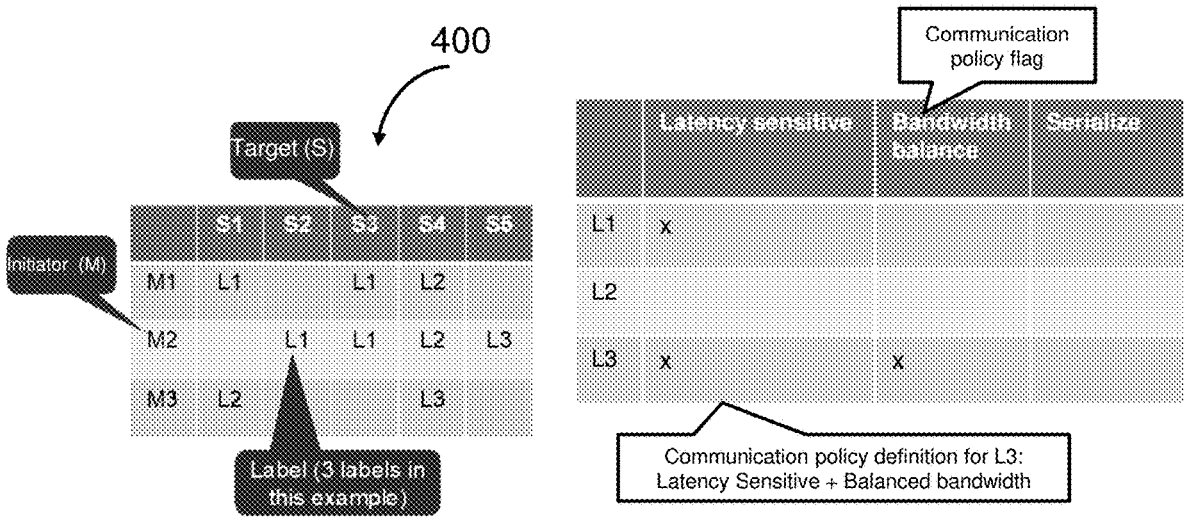
FIG. 4 shows a connectivity table of a NoC in accordance with the various aspects and embodiments of the invention.

Continuing with FIG. 2A and FIG. 2B and referring also to FIG. 4, a connectivity table 400 is shown. In accordance with the various aspects of the invention, the table 400 allows for traffic to be defined by classification. The tool permits using a traffic class label for each connection between an initiator and a target. As shown in table 400, there are three traffic classes: L1, L2, and L3. A traffic class label is an arbitrary label, chosen by the user or designer. Any number of labels can be defined and the scope of the invention is not limited by the number of labels. Each label represents the need for independent network resources. Each label will be given a distinct sub-network by the invention, which can be physically different, or use virtual networks, if supported by the underlying NoC technology.

In accordance with the various aspects of the invention, initiators are not required to be able to send requests to all targets or targets that are connected to the NoC. The precise definition of the target that can receive requests from an initiator is outline or set forth in the connectivity table, such as table 400. The connectivity and traffic class labelling information can be represented as a matrix. Each initiator has a row and each target has a column. If an initiator must be able to send traffic to a target, a traffic class label must be present at the intersection between the initiator row and the target column. If no label is present at an intersection, then the tool does not need connectivity between that initiator and that target. For example, initiator 1 (M1) is connectively communicating with target 1 (S1) using a defined label 1 (L1) while M1 does not communicate with S2 and hence there is no label in the intersection of M1 and S2. In accordance with the various aspects of the invention, the actual format used to represent connectivity can be different, as long as each pair of initiator-target combination has a precise definition of its traffic class, or no classification label if there is no connection.

Figure 5:
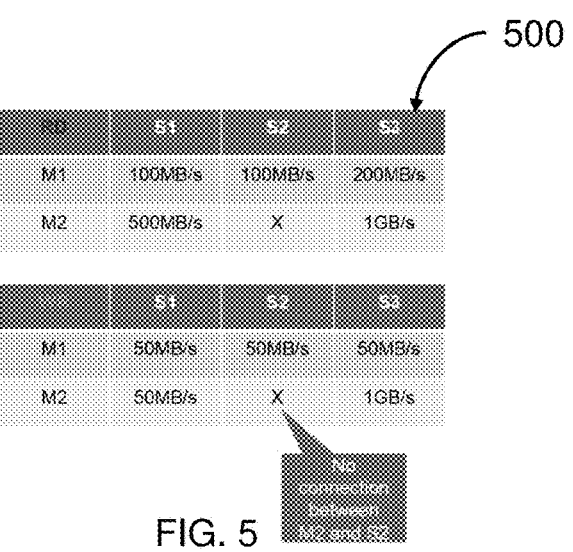
FIG. 5 shows a scenario table with throughput definitions for read and write transactions in accordance with the various aspects and embodiments of the invention.

Referring now to FIG. 5, a table 500 is shown in accordance with the various aspects of the invention, that includes various scenarios (shown in FIG. 2A) for read (RD) and write (WR) transaction. The table 500 includes information that define the various throughput rates provided to the tool. A scenario defines the expected performance in term of throughput of data between an initiator and a target. Each scenario describes the expected required read bandwidth and the expected required write bandwidth between each initiator and each target. Throughput is defined in bytes-per-second (B/s). A typical SoC will have multiple mode of operations. As an example, a SoC for a smartphone might have a gaming mode of operation, an audio call mode of operation, an idle mode of operation and so on. These define scenarios that depend on different throughput rates. Thus, a set of scenarios represents the different mode of operation the SoC supports and, correspondingly, the expected NoC minimum performance in terms of throughput between initiators and targets.

A scenario can be represented as 2 matrices, one defining read throughputs and one defining write throughputs. In accordance with the various aspects of the invention, read throughput requirements will be used to size the response network, which handles data returning from targets back to initiator. Write throughput requirements will be used to size the request network, which is data going from initiator to target, in accordance with the various aspects of the invention. An example, in accordance with the various aspects of the invention, of the throughput requirements for the various scenarios is shown in table 500. The actual format used to represent a scenario can be different, as long as each pair of (initiator, target) has a precise definition of its minimum required throughput for read and for write. In table 500, read transaction from M1 to S1 has a minimum performance throughput of 100 MB/s. In table 500, a write transaction from M1 to S1 has a minimum throughput of 50 MB/s.

In accordance with some aspects of the invention, scenarios are not defined for the tool, in which case the tool optimizes the NoC synthesis process for physical cost, such as lowest gate cost and/or lowest wire cost.

Figure 6:
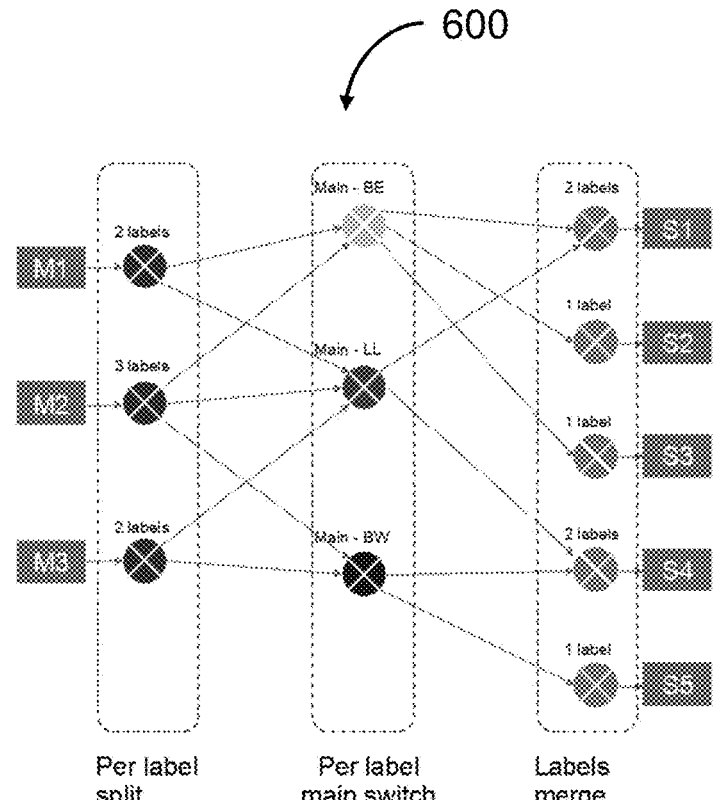
FIG. 6 shows creation of a network with 3 traffic classes in accordance with the various aspects and embodiments of the invention.

Referring now to FIG. 6 along with FIG. 2B, an initial network 600 is created in accordance with the various aspects of the invention. The network 600 implements the connectivity matrix with the following defined parameter or components:

one network interface unit per initiator, one network interface unit per target, one switch is created per defined traffic class, called the main switch of the class, one switch after each initiator/initiator NIU that split traffic to the different main switches that this initiator needs to reach, one switch before each target/target NIU that merges traffic from the different main switches that are sending traffic to that target The data width of each switch, and the clock domain it belongs to, is computed using the data width of each attached interface, and their clock domain, as inputs to the tool. In accordance with the various aspects of the invention, each step that transforms the network, which is part of the NoC, also perform the computation of the data width and the clock domain of the newly created network elements.

Figure 7:
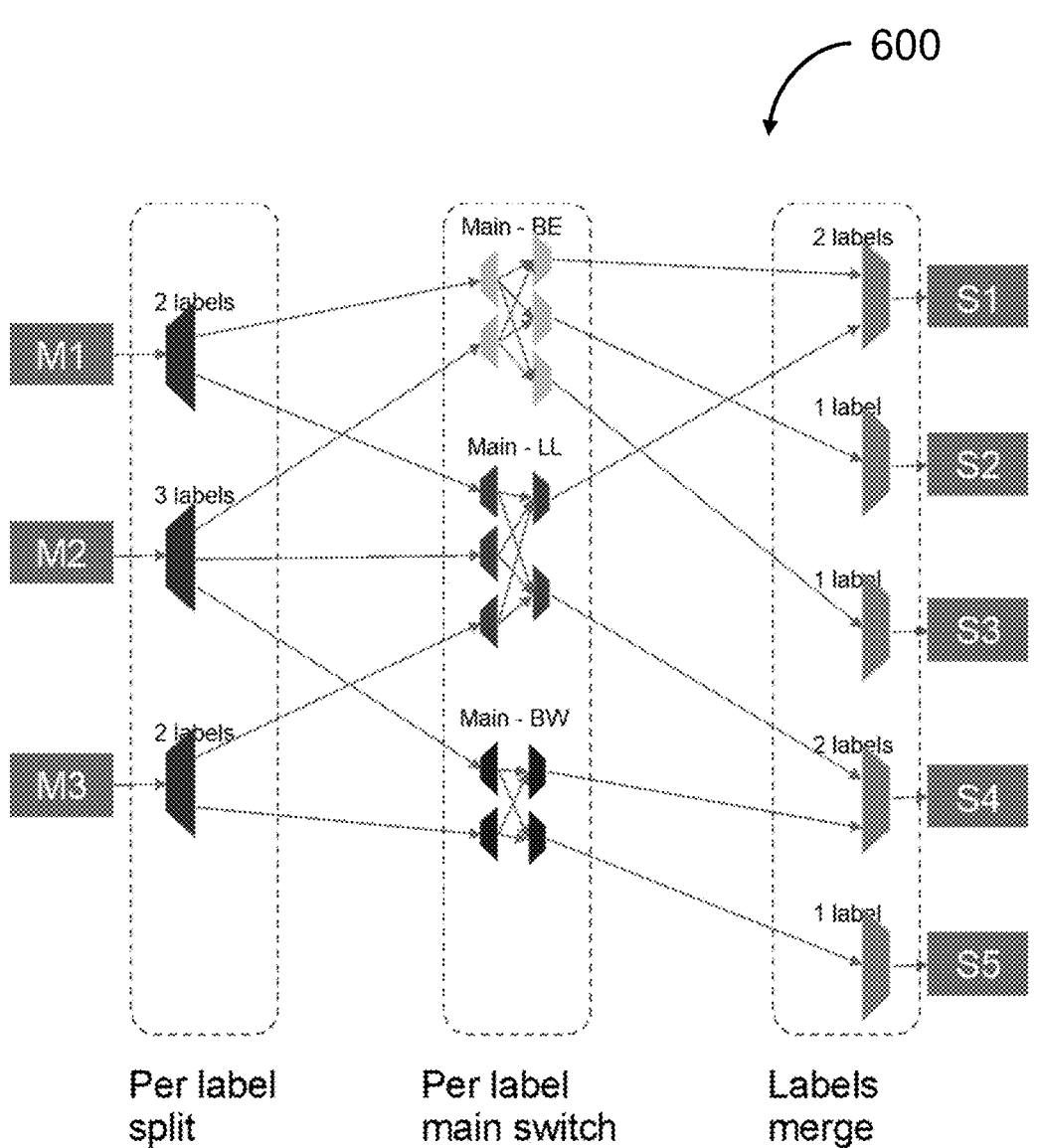
FIG. 7 shows decomposition of the network of FIG. 6 with mergers and splitters in accordance with the various aspects and embodiments of the invention.

Referring now to FIG. 7 and FIG. 2B, the network 600 of FIG. 6 is shown wherein the tool's process transforms of the network 600 in accordance with the various aspects of the invention. The sequencer 250 has an input 254 representing the main switch decomposition into mergers and splitters. The tool decomposes each main switch of the network 600 into its equivalent implementation with splitters and mergers. In accordance with the various aspects of the invention, some switches have a single ingress port and multiple egress ports. In accordance with the various aspects of the invention, some switches that have multiple ingress ports and a single egress port. Each main switch ingress port is connected to a splitter, each main switch egress ports is connected to a merger. For a main switch, splitters and mergers are connected together according to the connectivity table.

Figure 8:
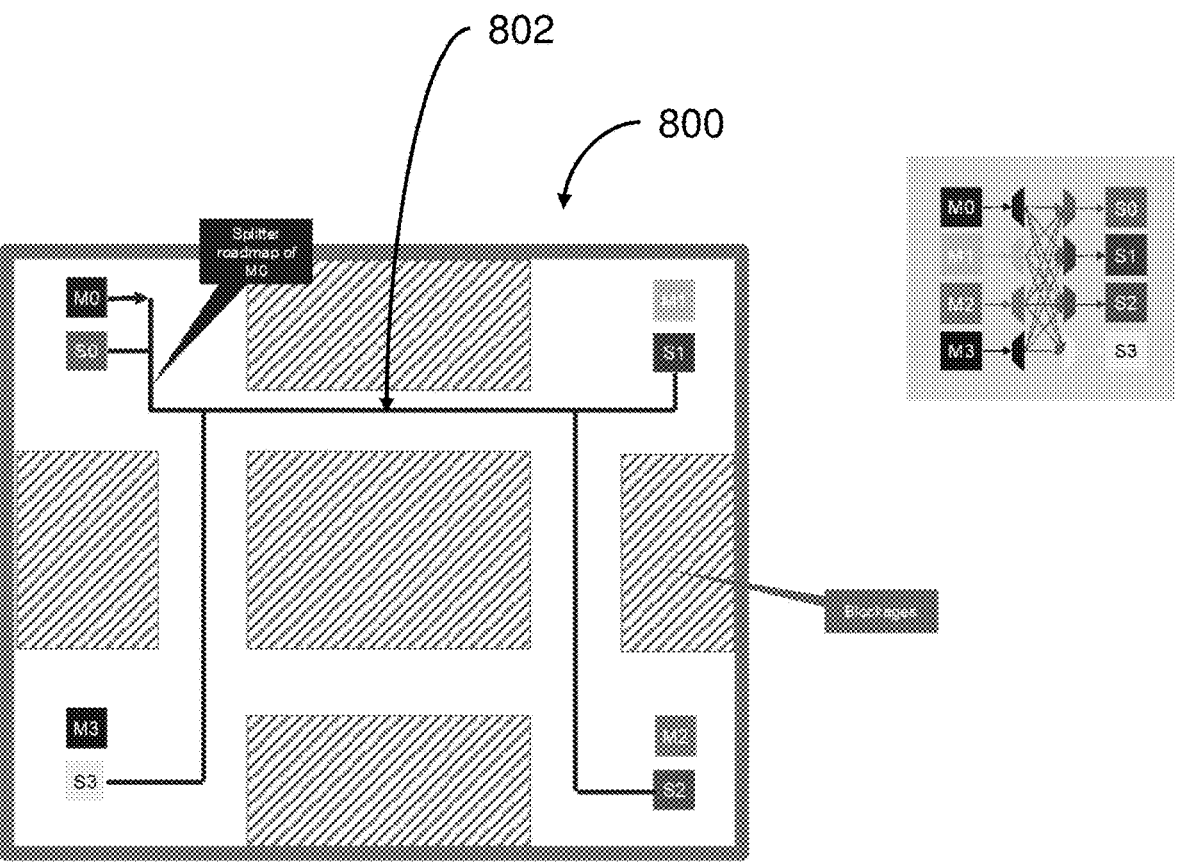
FIG. 8 shows a roadmap in a floorplan for one initiator of the network of FIG. 6 in accordance with the various aspects and embodiments of the invention.

Referring now to FIG. 8, a floorplan 800 is shown in accordance with the various aspects of the invention. The sequencer 250 has an input 256 representing a roadmap creation between each initiator and target. The floorplan 800 includes a physical path 802 that is computed between an initiator interface (M0) on the floorplan, and each of its connected targets, such as target S0, target S1, target S2, and target S3. The path 802 is called the splitter roadmap of the initiator M0; while not shown, every initiator will have a splitter roadmap. The tool uses any algorithm suitable to finding a path between a source point and multiple destination points, including algorithms that minimizes the length of the paths.

Referring now to FIG. 9, the floorplan 800 with a computed a physical path 902 between a target interface for the target S0 on the floorplan and each of its connected initiators. The path 902 is a merger roadmap of the target S0. As will be apparent, every target will have a merger roadmap. The tool uses any algorithm suitable to finding a path between multiple sources point and a destination point can be used, including algorithms that minimizes the length of the paths. In accordance with the various aspects of the invention, the tool transforms the network in a way that maintains its functionality and adds location information to the network elements.

Figure 10:
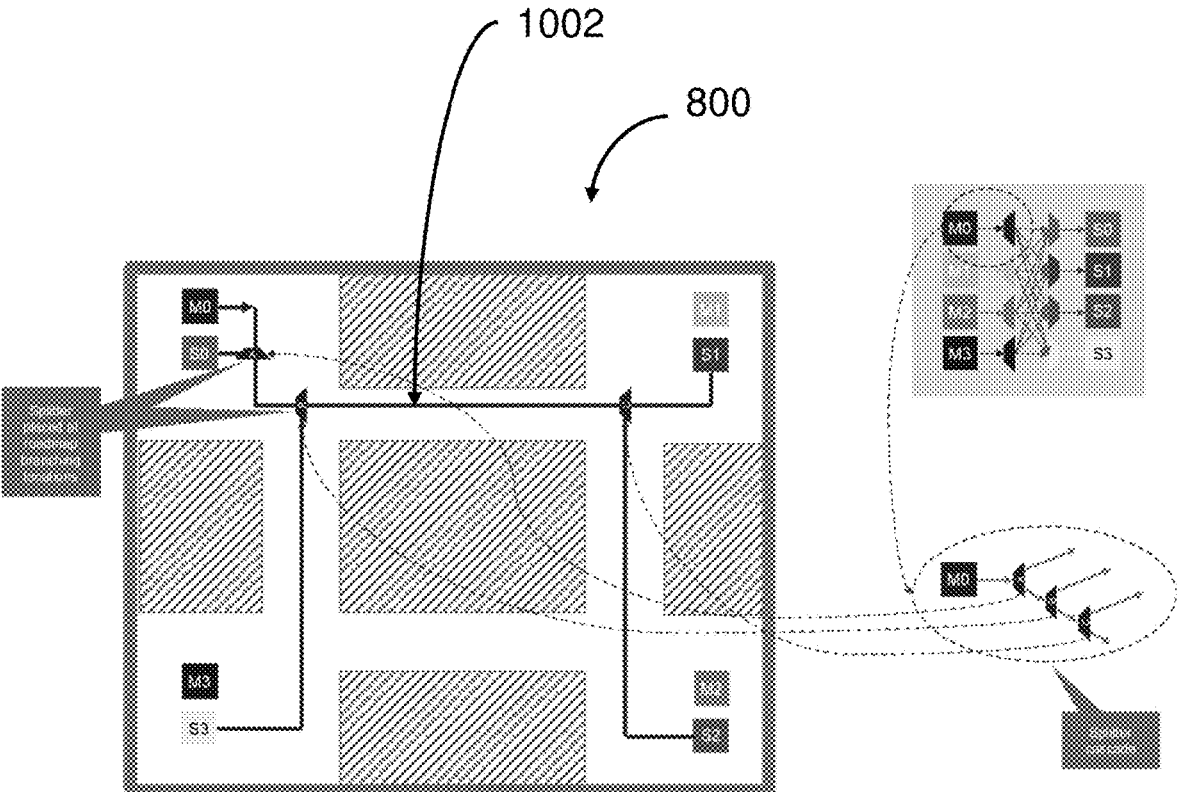
FIG. 10 shows decomposition of a main node splitter into a cascade of splitters distributed physically along the roadmap of FIG. 8 in accordance with the various aspects and embodiments of the invention.

Referring now to FIG. 10, the floorplan 800 is shown with a path 1002 in accordance with the various aspects of the invention. The sequencer 250 has an input 258 the provides physical distribution of splitters and mergers on the roadmap. Using the tool, each switch is decomposed into mergers and splitters. Using the tool, each splitter in the main switch is decomposed further into a cascade of splitters and each splitter of the cascade being placed on a branching point of the splitter roadmap of the attached initiator. The branching point of the roadmap is defined by the fact that the path is being split into two or more branches.

Figure 11:
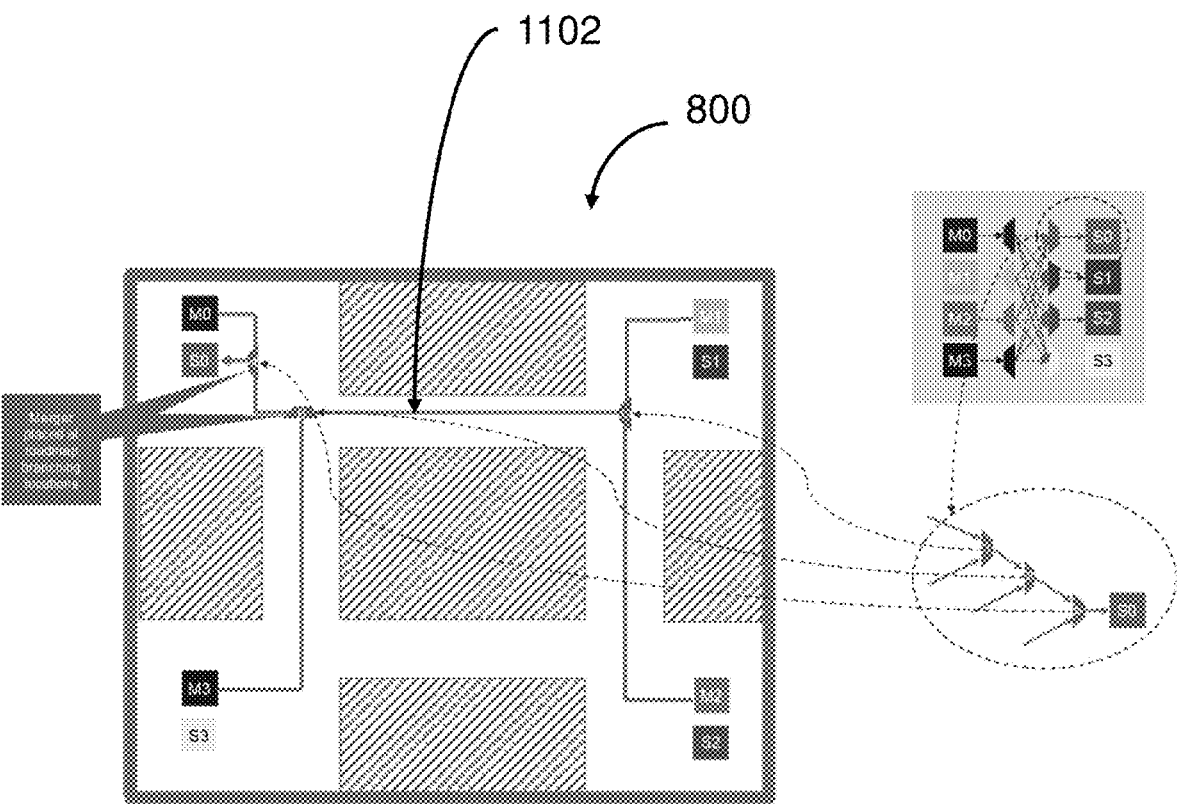
FIG. 11 shows decomposition of a main node merger into a cascade of mergers distributed physically along the roadmap of FIG. 9 in accordance with the various aspects and embodiments of the invention.

Referring now to FIG. 11, the floorplan 800 is shown with a path 1102 in accordance with the various aspects of the invention. Using the tool, each switch for each of the mergers in the main switch, the merger is decomposed further into a cascade of mergers, each merger of the cascade being placed on a branching point of the merger roadmap of the attached target. The branching point of the roadmap is defined by the fact that the path is being split into two or more branches. The process of decomposing a splitter in a cascade of splitters preserves the original splitter functionality, as the number of inputs to the cascade is still one, and the number of outputs of the cascade is identical to the number of outputs of the original splitter. The process of decomposing a merger in a cascade of mergers preserves the original merger functionality, as the number of outputs of the cascade is still one, and the number of inputs to the cascade is identical to the number of inputs to the original merger. In accordance with the various aspects of the invention, the effect of the process is to obtain a set of elementary switches, which are represented by the mergers and the splitters, that are physically placed close to where the actual connections between switches need to be.

In accordance with the various aspects of the invention, the tool transforms the network in order to reduce the number of wires used between switches achievable, while keeping the performances as defined in the scenarios, which are a set of required minimum throughput between initiator and target. In accordance with the various aspects of the invention switches are clustered for performance aware switching, mergers and splitters that have been distributed on the roadmaps are treated like ordinary switches.

In accordance with an aspect of the invention, the tool uses a process that is iterative and will merge switches under the condition that performances are still met, until no further switch merge can occur. The tool uses a process that is described as follows:

1) while no more switch fusion is possible, do the following:

a) Select a candidate switch for fusion with one of its neighbors. The selection process ensures all switches in the network are eventually candidates.

b) When a candidate is selected, search for a neighbor to fusion with. The neighboring criteria is based on evaluation of a cost function. The cost function shall return a switch that is "best suited" to fusion with the candidate. The definition of "best suited" is implementation dependent, but the cost functions shall be such that the potential fusion of the two switches maximizes the gain in term of at least one metric including: wire length; logic area; power; and performances, etc.

c) Test if, in case the fusion happens, that the performance scenarios will still all meet the minimum throughput requirements. If not, then these two switches cannot be merged. The process executed by the tool searches for another neighbor until either no more neighbors can be found, in which case all switches are left intact, or one neighbor is found that can be merged with the candidate without violating the minimum throughput requirements of all scenarios, in which case the network is modified by merging the candidate switch with the neighbor.

In accordance with various aspects of the invention, it is possible for the process to ensure the switches do not grow above a certain size (maximum number of ingress ports, maximum number of egress ports). If a combined switch is above the set threshold, then the merge is prevented.

Figure 12:
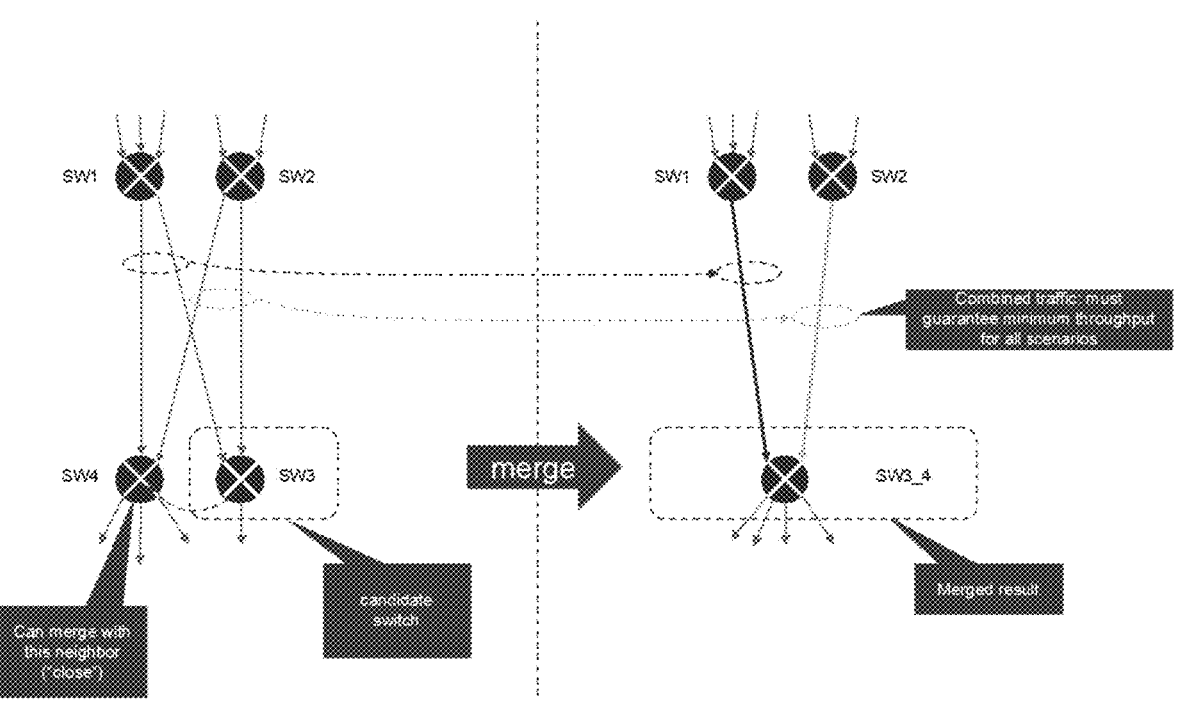
FIG. 12 shows an example of two nodes that are close and merged in accordance with the various aspects and embodiments of the invention.

Referring now the FIG. 12, candidate switch SW3 is shown next to switch SW4 for the merger, in accordance with the various aspects of the invention. The sequencer 250 has an input 260 that provides performance aware switching clustering. The tool executes a process for merging two switches. When the switches are merged, the wires that were going from different switches, are simplified into one wire from each connected switch to the combined switch. In accordance with the various aspects of the invention, switches SW3 and SW4 are merged. The connections between SW1 and SW4 and SW3, are combined and replaced by a single connection between SW1 and SW3_4. Thus, long connections between distant switches are removed and reduced to a minimum, while connections between close switches are removed and done inside the switch themselves.

Referring again to FIG. 2B, an input 262 to the sequencer 250 includes various optimizations can be performed to further reduce the number of wires used by the network, the area of the network elements, and the power consumed by network elements. Examples of such optimization include: detection of links that can be removed because they are not used, or their traffic can be re-routed; reducing the width of a link if the link is wider than required by the scenarios; and performing wire length optimization through finding an optimal placement of all the switch elements that minimizes the total wire length of the network, wherein the total wire length of the network is the sum of the distance spanned by each connection between network elements times the width of that connection.

Continuing with FIG. 2B, an input 264 to the sequencer 250 includes producing a legal NoC by modifying the location of the network elements so that the network elements fit in the allocated free space and do not overlap, and they exist in the corresponding clock and power domain limits. In accordance with various aspects of the invention, the area occupied on the die by each network element is computed using the information provided regarding the capabilities of the technology, such as the area of a reference logic gate. Then each element is tested for correctness of its placement (enough free space exists for the element, no other element overlaps). If the test fails, the element is moved until a suitable location is found where the test passes.

Formalism

Figure 13:
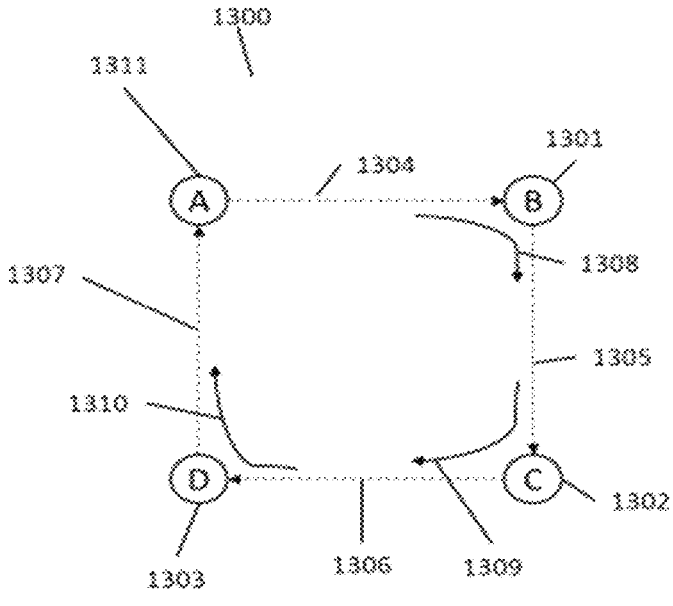
FIG. 13 illustrates a NoC topology over a floorplan having a deadlock-free network of segments and turns in accordance with the various aspects and embodiments of the invention.

Referring now to FIG. 13, floorplan 1300 illustrates a deadlock-free NoC that may be expressed in terms of a plurality of segments and turns. A segment represents a directed channel between two components, for example, "A" 1311 and "B" 1301, "B" 1301 and "C" 1302, "C" 1302 and "D" 1303, and/or "D" 1303 and "A" 1311. First segment 1304 holds a physical path in the floorplan between "A" 1311 and "B" 1301, second segment 1305 holds a physical path in the floorplan between "B" 1301 and "C" 1302, third segment 1306 holds a physical path in the floorplan between "C" 1302 and "D" 1303, and fourth segment 1307 holds a physical path in the floorplan between "D" 1303 and "A" 1311, which is a list of physical coordinates $(x_i, y_i)$. It is within the scope of this invention for a segment to have one or more associated cost metrics that may be utilized during synthesis and/or generation to track the cost of certain routines.

A turn, being a pair of segments, may be utilized in a manner that avoids deadlocks in a network. The network remains deadlock-free as long as no cycles exist between segments, given the allowed turn 1308, turn 1309, and turn 1310. In accordance with another aspect or embodiment of the invention, cycles may exist between the nodes. Turns have a dependency between the segments which is the basic mechanism that ensures that a network is deadlock-free. It is within the scope of this invention for cycles between nodes to exist, to reuse wire, without causing deadlocks so that only necessary channels are allocated to prevent node cycles. As a result, this eliminates unnecessary channels and reduces the associated wire cost associated therefrom.

Referring again to FIG. 13, the presence of first turn 1308 from first segment 1304 to second segment 1305 indicates that a packet may be routed from first segment 1304 to second segment 1305. The presence of second turn 1309 from second segment 1305 to third segment 1306 indicates that a packet may be routed from second segment 1305 to third segment 1306. The presence of third turn 1310 from third segment 1306 to fourth segment 1307 indicates that a packet may be routed from third segment 1306 to fourth segment 1307. In regards to segment splitting, a segment "S1" to "S2" may be split at any point $(x_i, y_i)$ of its physical route, resulting in two new segments. This network is deadlock-free, as turn (D, A) approaches (A, B) does not exist.

Referring now to FIGS. 14A-14D, an embodiment of segment splitting on NoC 1400 is shown. Segment 1403 (FIG. 14A) is defined by node "A" 1401 to node "B" 1402. Segment 1403 may be split 1404 (FIG. 14A) at any point (xi, yi) of its physical route into new first segment 1409A (FIGS. 14B-14D) and new second segment 1409B (FIGS. 14B-14D). FIGS. 14B-14D best depicts a result of this splitting 1404 (FIG. 14A) where newly created node "S" 1408 (FIGS. 14B-14D) is formed. First turn 1405, second turn 1406 (FIGS. 14B-14D), and third turn 1407 are shown.

FIG. 14B illustrates segment splitting of a NoC topology having the split segment "A" 1401 to "B" 1402 updated to use two new sub-segments "A" 1401 to "S" 1408 and "S" 1408 to "B" 1402. Newly created node "S" 1408 is a new switch in the NoC. The set of turns involving the split segment is updated to use the two new sub-segments. The new turn 1406 is added while preserving turn 1407.

A segment that has been split is no longer considered "as-is" because the split has resulted in sub-segments with variable routes. This recursive representation is essential for incrementality, as it ensures that segments which are part of existing routes and which may need to be split can still be recovered, as a succession of sub-segments, when re-constructing the existing routes. Splitting a segment allows the segment to be connected to a new segment. This results in a new set of turns.

FIG. 14C depicts new segment 1411 represented by a channel between node "N" 1410 and node "S" 1408 being merged into the split segment, resulting in new turn 1412.

FIG. 14D depicts new segment 1413 represented by a channel between node "N" 1410 and node "S" 1408 being forked out into the split segment, resulting in new turn 1414. The added node "N" 1410 may include, but not be limited to, an IP block and/or an initiator.

In accordance with one aspect and embodiment of the invention, the system performs the generation and synthesis process and all existing network routes are translated into segments and turns. In an embodiment, the whole NoC is described as a set of at least one segment as defined by the physical path existing between two nodes (S,D) for example. In accordance with the various aspects and embodiments of the invention, if the network is not deadlock-free, the system provides a "fail" notice and returns to the user, as the network or NoC must be initially deadlock-free in accordance with one or more aspects of the invention. The system also extract the set of connections that do not have defined routes and/or connections that need to be synthesized. Sort the extracted set of connections given a heuristic. In accordance with the various aspects and embodiments of the invention, for each connection Source "S" to Destination "D", the single connection synthesis process involves using a configuration explorer, a configuration filtering module, a configuration selection module, splitting, creating, and route computing. Configuring, by assigning a clock domain and a data width setting, each of the newly created components, switches and links, such that the bandwidth requirements are fulfilled.

Figure 15:
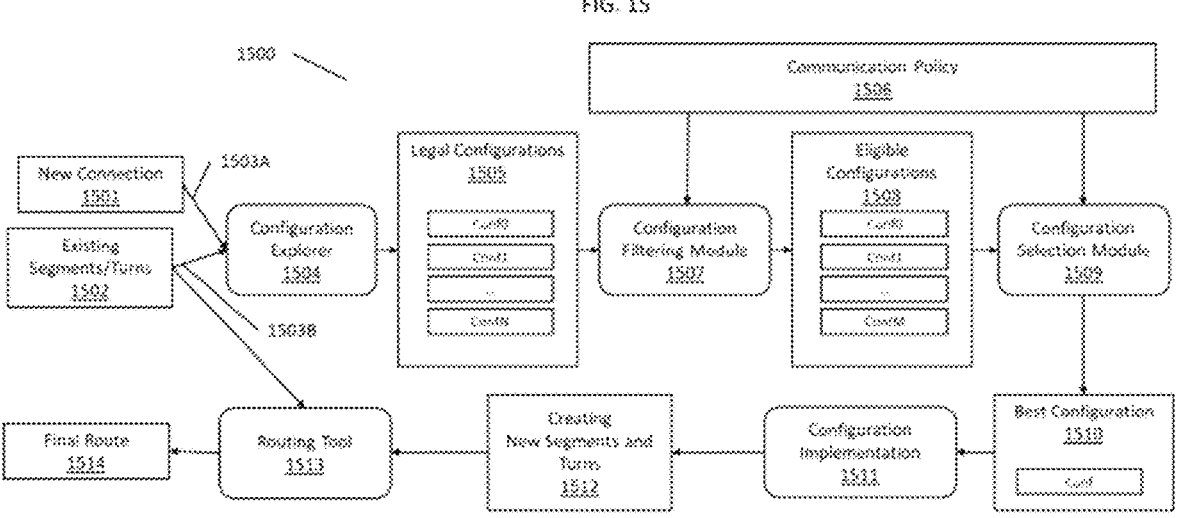
FIG. 15 is a flowchart illustrating a method for single connection NoC topology synthesis processing in accordance with the various aspects and embodiments of the invention.

FIG. 15 is a flowchart illustrating method 1500 for a NoC generator using topology synthesis processing. Input 1503A to be synthesized may be new connection 1501 and/or input 1503B may be an existing segment 1502. New connection 1501 includes of creating new components, such as switches and/or links, defining a network route from "S" to "D". Existing segment 1502 may be re-expressed as at least one segment and/or a pair of segments having at least one turn. An existing network has a set of turns that cannot be changed. When new segments are added, turns associated with the newly added segments are added as well to complete a route from "S" to "D". The added turns do not generate cycles and/or deadlocks with existing turns.

Configuration explorer 1504 receives input 1503A being new connection 1501 and input 1503B being existing segment 1502. Since there are a plurality of ways to connect to a segment "S" to "D", configuration explorer 1504 influences the best configuration based on each segment being assigned communication policy 1506. Configuration explorer 1504 explores different ways to connect "S" to "D" using exploration of legal configurations 1505. Legal configurations 1505 are a list of described parameters. Configuration explorer 1504 is configured to explore and/or review and analyze at least one configuration of possibilities indicating a location, traversing the segment, to split a segment from a list of meaningful configurations stored in memory. Configuration explorer 1504 may have a configuration with a new entry segment for connecting "S" to some segment of the NoC. If "S" is already connected, it already has an entry segment. Configuration explorer 1504 may have a configuration with a new exit segment for connecting.

The cost of a given path is updated at each step according to communication policy 1506. In an example, moving within an existing segment away from the destination may have more or less cost than creating a new segment that directly reaches the destination depending on whether communication policy 1506 favors wire length and/or latency. It is within the scope of this invention for a well-established, shortest path algorithm to explore both concrete segments and identify potential future segments, using the cost updates as a way to effectively implement several communication policies.

The main configuration exploration process 1504 may be designed as specialized version of a common shortest-path algorithm including, but not limited to, A* and/or Dijkstra. A given step in the shortest path algorithm considers the different points that can be reached from the current point. The current point is at least one point along the physical path of an existing segment. The path from the current point in the current segment to a subsequent point is subject to considerations.

In an embodiment, the path may advance one step along the current segment's path. In an embodiment, if the end of the segment's path has been reached, the path may advance to the first point in the path of any of the next segments, such as segments that are directly connected to the current segment, and which the current segment is capable to "turn" to.

In an embodiment, if the destination is not connected, such as if no exit segment exists, the path may jump directly to the destination point. This corresponds to creating a new exit segment. The new and/or future exit segment is then added to the configuration.

In yet another embodiment, the path may jump to any point of any segment, as long as no cyclic-dependencies are created, the two segments have compatible communication policies, and the communication policy allows merging. This corresponds to creating a new internal segment, which is added to the configuration.

Referring again to FIG. 15, configuration filtering module 1507 has a predetermined listing containing data including, but not limited to, which configurations are legal, which configurations result in deadlocks, which configurations are not optimal. Configuration filtering module 1507 filters configurations given multiple criteria including, but not limited to, communication policy 1506 based criteria and/or any custom criteria and only keeps a sub-set. In an example of custom criteria, a user such, as a programmer, may base the parameters on low latency defined by a shorter length between the route from "S" to "D". The user may define a maximum length of a path. Configuration filtering module 1507 of communication policy 1506 will remove a route if the length of the path exceeds the user defined threshold. In another example, the parameters may be based on the use of a minimum number of extra wires. In another example, a parameter may be based on a cost function that favors a route from "S" to "D" having the lowest cost. Configuration filtering module 1507 is customizable to user predefined parameters. A user may set their own filters and discard certain types of configurations.

The first criteria is communication policy 1506 based criteria. A user may control the way in which new segments are created. Communication policy 1506 is a set of parameters that may be associated with any given connection in the network. The system may have a plurality of communication policies defined and each connection may be associated with one communication policy 1506. Communication policy 1506 has parameters and flags. In an example of a flag, low latency is when a connection should be implemented in a way that minimizes the total path length from source to destination. In another example of a flag, enable serialization is when the links involved in the path from source to destination are allowed to employ serialization to save wire. Some configurations for a given connection may not be legal with respect to communication policy 1506 governing the connection. Eligible configurations 1508 are a filtered version of legal configurations. In an example, if connection "S" to "D" is set to have a low latency communication policy, then a limit on the total length of the route and the number of hops or traversed components must be applied and configuration candidates that do not fall within these limits are discarded.

Referring again to FIG. 15, after filtering, configuration filtering module 1507 outputs eligible configurations 1508. It is desirable to select one eligible configuration performed by configuration selection module 1509. Selecting the best configuration is achieved using configuration selection module 1509, which retains only one final configuration to be implemented as the final synthesis of connection "S" to "D". The metric used to select a best configuration is configurable and may take several parameters into account, based on community policy 1506. In an embodiment, a communication policy parameter is total additional wire-length The length of extra created segments creates wire needed to traverse a route. There are costs associated with wire. It would be more desirable for a parameter to be aimed at minimizing the total wire length to reduce the cost of topology. In an embodiment, a communication policy parameter is total route length. The total length of the route is the combination of the total of existing segments plus the newly added segments. This parameter is focused on minimizing the latency. In another embodiment, a communication policy parameter is based on bandwidth distribution. This parameter optimizes performance by focusing on traffic distribution and the associated level of congestion on the segments.

Once best configuration 1510 is selected, the system will implement 1511 best configuration 1510 by splitting the segments involved and creating 1512 new segments and turns and apply it to the network. It is within the scope of this invention for the best configuration to be the final configuration. When a segment is split, it is split at all the existing segments that need to be connected to new segments at the points dictated by the chosen configuration. In regards to optimization, if the splitting point is within a certain distance from one of the segment's endpoints, and the endpoint is a switch, then the endpoint shall be reused for the connection instead of creating a new switch. This can reduce the number of created switches. Creating 1512 the required new segments dictated by the chosen configuration and activate the corresponding turns. The newly created 1512 segments and turns in combination with existing 1502 segments and turns are input into routing tool 1513 that generates final route 1514. The route is computed from "S" to "D" given the newly created segments. The route is stored in memory. Routing tool 1513 is routing connections on the geographical floorplan because the segment is defined in terms of its geographical path following the floorplan.

Figures 16A, 16B:
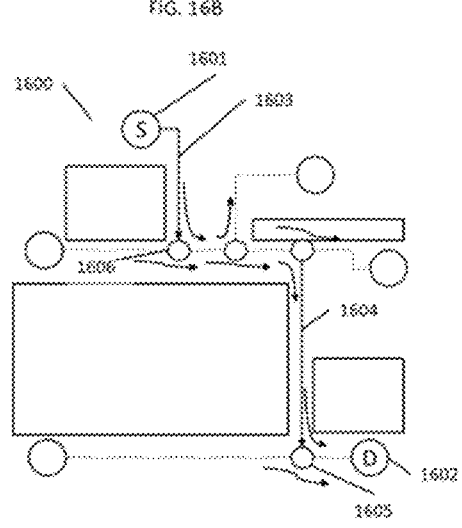
FIG. 16A illustrates a NoC topology over a floorplan having request for connecting node "S" to node "D" in accordance with the various aspects and embodiments of the invention.
FIG. 16B illustrates a NoC topology over a floorplan having an incremental synthesis result of a routing configuration from "S" to "D" with a new entry segment, a new internal segment, and an existing exit segment in accordance with the various aspects and embodiments of the invention.

FIG. 16A illustrates a NoC topology over a floorplan having a node "S" 1601 to node "D" 1602. If there is an existing network and a change is requested such as, a request for adding a new connection from node "S" 1601 to node "D" 1602 an incremental synthesis will need to be performed. IP blocks are an example of restrictions on the floorplan that a route needs to navigate around. Existing nodes are connected to each other. It is desirable to create a route, for a new connection, in the existing network without having to make changes to the existing structures.

FIG. 16B illustrates a NoC topology over a floorplan having an incremental synthesis result of a routing configuration from "S" 1601 to "D" 1602 with new entry segment 1603 having node "S" 1601 and node 1606, new internal segment 1604 having node, and exit segment 1605. The exploration of legal configurations 1505 is shown in a configuration illustrated in FIG. 16B, where entry segment 1603 is added if the node is not already connected to the NoC. In an embodiment, new entry segment 1603 is capable of connecting "S" 1601 to a segment of the NoC. If "S" 1601 is already connected to a segment of the NoC, it already has an entry segment.

In the illustration of FIG. 16B, exit segment 1605 was existing because "D" was already connected to another node. So, if "D" is already connected, it already has an exit segment. A new exit segment may be a configuration option for connecting some segment of the NoC to "D".

Referring again to FIG. 16B, it is within the scope of this invention for there to be any number of internal segments

1604. At least one and/or a plurality of new internal segments may connect existing segments in such a way that the entry segment reached the exit segment. A connection between two existing segments is considered only if it does not create a cyclic dependency between the segments, ensuring only deadlock-free configurations are considered. The synthesis may include in computing a network route, without creating any new switches and/or segments. This is the case if "S" and "D" are both connected to the network and the entry segment can already reach the exit segment given only the existing turns. It is an important aspect of this invention that the configuration may define future segments, whereby, no concrete segments are created in the topology during the exploration phase.

In an embodiment, the system may pre-set a number of common communication policies to make the choice easier for a user. It is more desirable for a user to pick from a list of presets instead of requiring a user to create a communication policy. Connections that are associated with different communication policies will have synthesized routes that are physically separated. During synthesis, configuration filtering module 1507 (FIG. 15) and configuration selection module 1509 (FIG. 15) rely on communication policy 1506 (FIG. 15) to output best configuration 1510 for implementing 1511 a route.

FIG. 17A illustrates a NoC topology over a floorplan having communication policy 1700 being to optimize wire length with a best effort performance. FIGS. 17A and 17B show how the same connection may lead to different implementations based on the chosen communication policy. In the illustration of FIG. 17A, the focus is to connect node "S" to node "D" and the parameter for the wire length is the main criterion of optimization. The configuration selection module selects an implementation that creates minimum extra wire. It is shown that having short entry segment 1703 and one turn activated 1704 meets the parameter requirements.

FIG. 17B illustrates a NoC topology over a floorplan having communication policy 1710 being to a low latency communication. In this example, there is a direct connection 1713 preference between node "S" 1711 and node "D" 1712 rather than traversing several switchers. One turn activated 1714 is near "D". Although this configuration crates more extra wires and is more costly, it is the user selected path from "S" to "D" having the shortest length.

The basic method for incrementally synthesizing new connections while reusing existing segments is best shown in FIGS. 1-17B with additional features shown in FIG. 20-33. In accordance with some embodiments, the tool splits existing segments to fork out new segments. At the end of the process, only the newly created components are configured such as, a clock and/or data width, and the existing components are left unaltered. Referring again to FIG. 15, existing segments and turns 1502 are altered by user control at incrementality levels. A user utilizes communication policy 1506 to control the creation and selection of not only the new segments in a network, but also to modify the existing topology or segments. In an example, reusing an existing segment in new routes may not be desirable due to performance considerations or to previous optimizations that a user may have implemented and that depend upon the segment remaining unaltered. When a segment is split, a hop may be added to traverse a plurality of routes, which may not be the desired outcome. As a result, the system defines a number of incrementality levels, or modes, that are based on physical mutability of segments, physical mutability of switches, and logical mutability of network elements. It is more desirable to capture a user's intent when synthesizing a set of new connections in the presence of an existing NoC topology.

In an alternate embodiment, incremental synthesis modes allow a user to customize how the existing topology is altered.

In regards to physical mutability of segments, a segment is mutable by default. The segment may be split to fork-out a new segment. A user may make a segment immutable if, for example, it is not desired to have a switch added to an existing route.

Referring to physical mutability of switches, a new segment may be connected to an existing endpoint of an immutable segment if the endpoint is a switch. If it is not desired to modify the physical size of the switch, then the switch may be immutable so that no new segments can be connected to the immutable switch.

Referring now to logical mutability of network elements, as a default, existing network elements including, but not limited to, data width and/or an assigned clock, are not reconfigured by the incremental synthesis process. Only newly created switches and adapters are configured. This may lead to inefficient configurations such as insufficient bandwidth and/or too many clock domain crossings. Any component may be marked as logically mutable to allow existing components to be reconfigured given new resulting topology. In an example of how preset incremental synthesis modes can be defined in the system based on the aforementioned concepts, three preset modes are discussed.

Figure 18A:
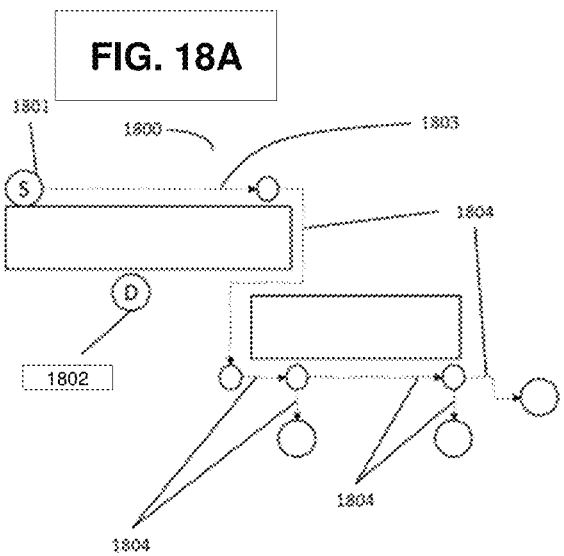
FIG. 18A illustrates an incremental synthesis mode 1800 for initial setup of segments being connected from node "S" to node "D" in accordance with the various aspects and embodiments of the invention.

FIG. 18A illustrates an incremental synthesis mode 1800 for initial setup of segments being connected from node "S" 1801 to node "D" 1802. High bandwidth segments 1803 and low bandwidth segments 1804 traverse the existing NoC topology route. During initial setup, user parameters will determine how existing topology is altered to connect "S" 1801 to "D" 1802.

Figure 18B:
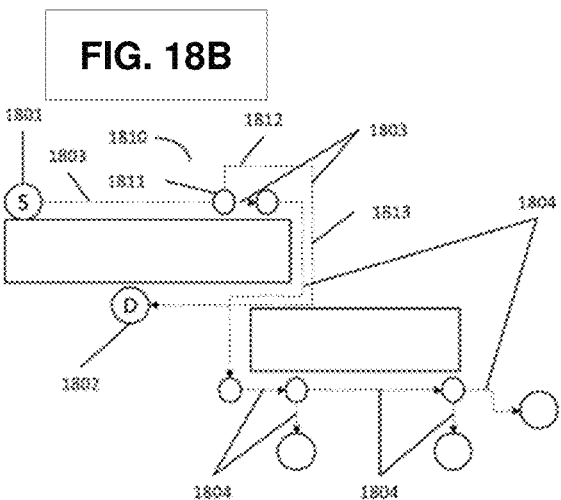
FIG. 18B illustrates an incremental synthesis mode 1810 for physical immutability of segments having a parameter being minimal change in accordance with the various aspects and embodiments of the invention.

FIG. 18B illustrates an incremental synthesis mode 1810 for physical immutability of segments having a parameter being minimal change. The segment is split 1811 to fork-out 1812 a new segment and a U-turn is created in a deadlock-free network to connect "S" 1801 to "D" 1802 with minimal change. High bandwidth segments 1803 are unaltered to prevent splitting and low bandwidth segments 1804 traverse are routed around the existing NoC topology route.

It is more desirable to preserve the greatest amount of existing topology. All segments are made physically immutable with the exception entry and exit segments because entry and exit segments are needed for implementing new connections. All switches are physically immutable and all the network elements are logically immutable. In an example, if one segment from "S" 1801 to "D" 1802 is marked immutable, and it will prevent splitting of the segment and facilitate a route around an existing segment. As a result, the existing segment remains unchanged.

Figure 18C:
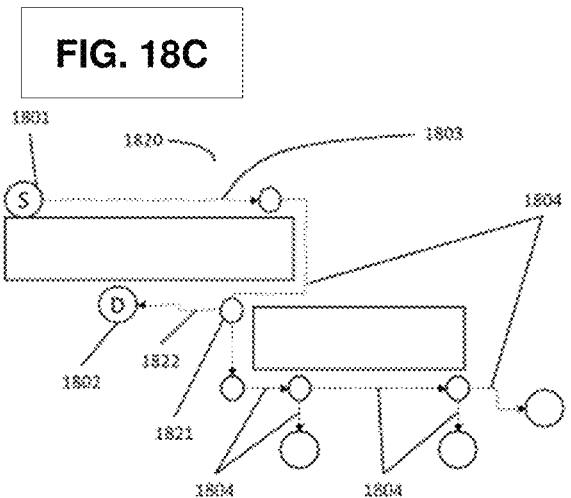
FIG. 18C illustrates an incremental synthesis mode 1820 for logical immutability of segments having a parameter being optimize topology and preserve configuration in accordance with the various aspects and embodiments of the invention.

FIG. 18C illustrates an incremental synthesis mode 1820 for logical immutability of segments having a parameter being optimize topology and preserve configuration. Low bandwidth 1804 segment was split 1821 and forked-out new segment 1822, and a new turn was created to connect "S" 1801 to "D" 1802. High bandwidth is not fully utilized because it was connected to a lower bandwidth and the switches cannot be changed. It would be more desirable for some switches to be changed to adapt. This preset allows for existing segments to be split and for switches to have new connections for more optimized topologies. As a result, a better cost through the reuse of existing elements may be achieved. Existing network elements may be made logically immutable to maintain, for example, a clock frequency, a clock assigned to a switch, and/or other attributes unchanged.

Figure 18D:
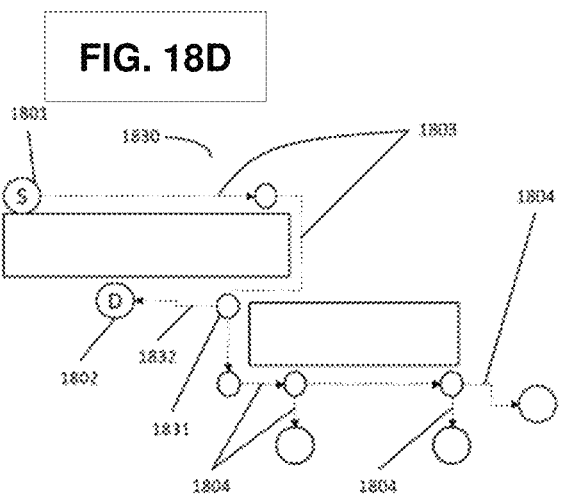
FIG. 18D illustrates an incremental synthesis mode 1830 for mutability of network elements having a parameter being optimize topology and adapt configuration in accordance with the various aspects and embodiments of the invention.

FIG. 18D illustrates an incremental synthesis mode 1830 for mutability of network elements having a parameter being optimize topology and adapt configuration. High bandwidth 1803 segment was split 1831 and forked-out new segment 1832, and a new turn was created to connect "S" 1801 to "D" 1802. High bandwidth is fully utilized because it was connected to a higher bandwidth because the switches were changed. More flexibility to the synthesis process is achieved when all segments can be split, switches can be connected to new segments, and/or components can be reconfigured if reconfiguring them improves the result, for example, when changing the clock to improve performance.

Figure 19:
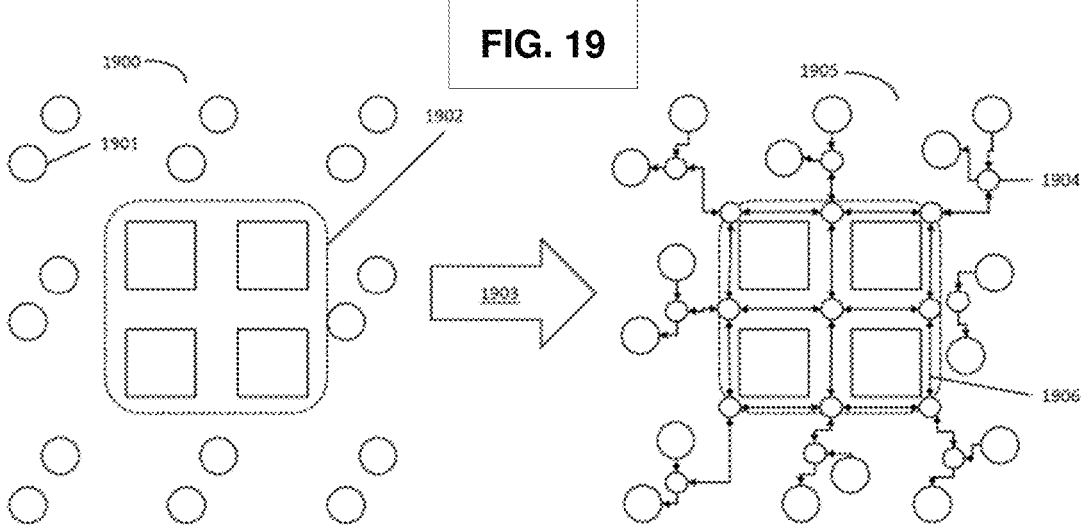
FIG. 19 illustrates a process of NoC synthesis based on a mesh custom subnetwork description in accordance with the various aspects and embodiments of the invention.
Figure 20:
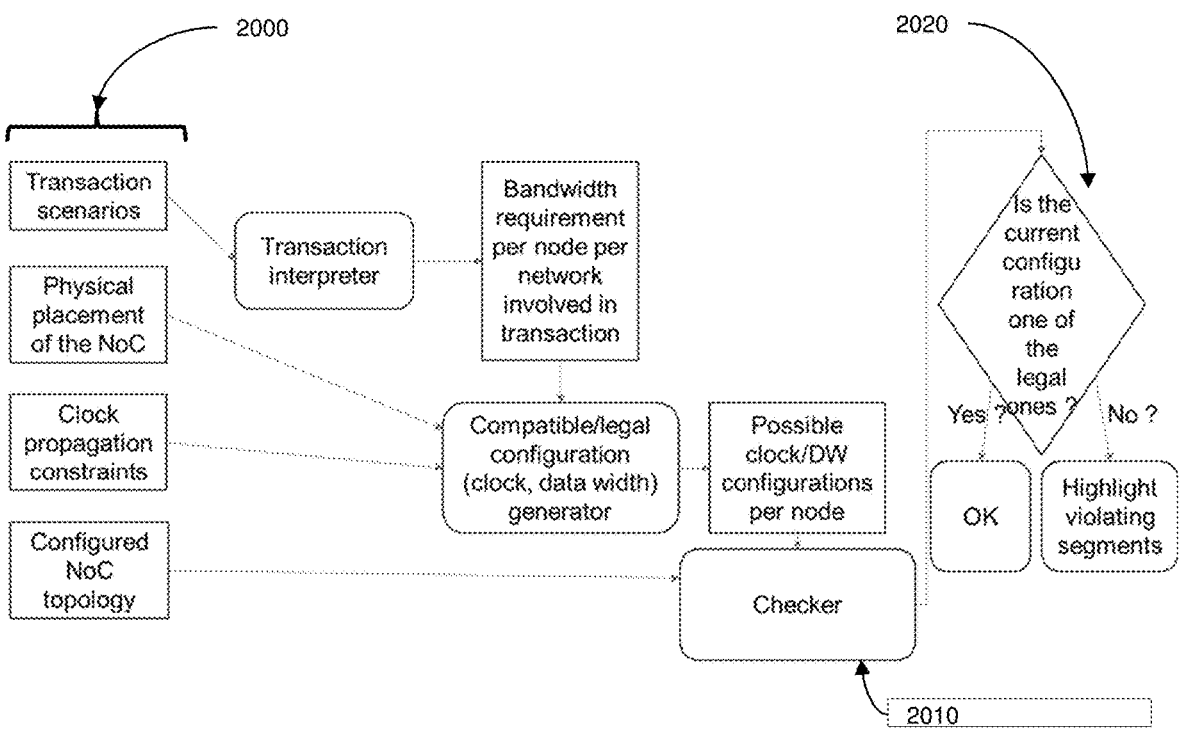
FIG. 20 illustrates a process for checking a NoC configuration in accordance with the various aspects and embodiments of the present invention.
Figure 21:
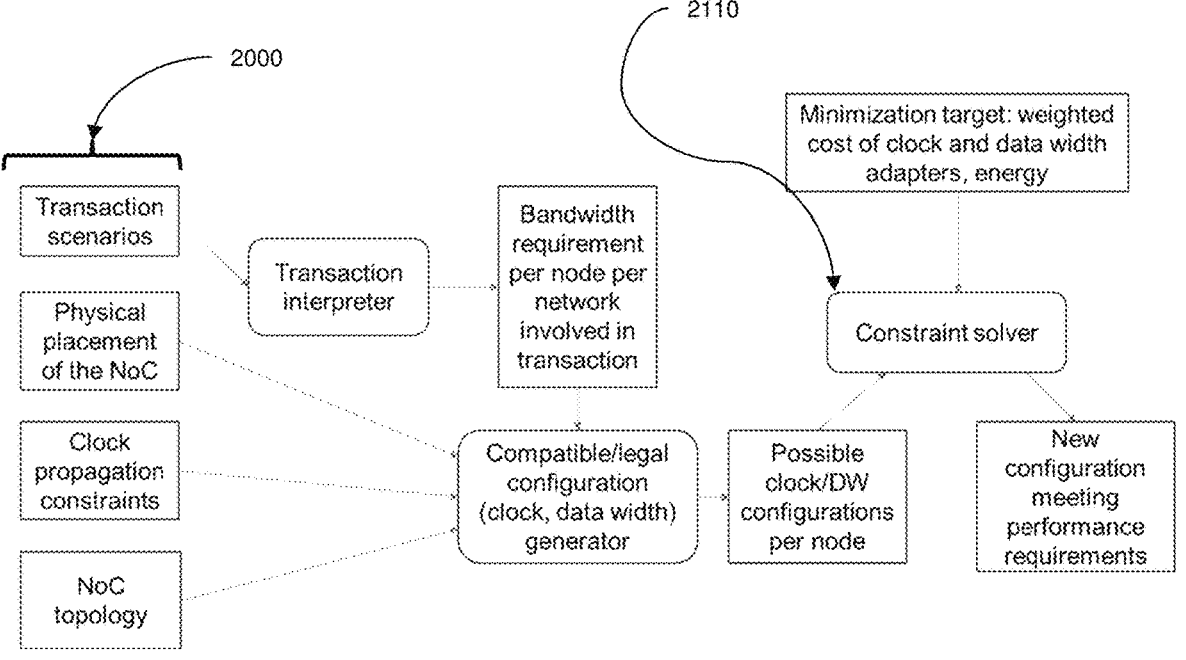
FIG. 21 illustrates a process for configuration of a NoC in accordance with the various aspects and embodiments of the present invention.

FIG. 19 illustrates a process of NoC synthesis based on a mesh custom subnetwork description. First, mesh segments are generated and physically placed optimally on the requested space. Second, the new mesh segments, now considered as pre-existing segments by the incremental synthesis process are used opportunistically when appropriate to generate the final routes. The result is a topology mixing an automatically generated regular mesh topology with new optimally synthesized segments. In a fully connected system NoC 1900 has each node 1901 connecting to every other node. Region 1902 is specified for a 3×3 mesh using an XY routing algorithm. As a result of the synthesis process 1903, NoC 1905 uses requested mesh segments and newly synthesized segments. Automatically synthesized local trees 1904 are shown. Mesh is generated and optimally placed within specified region 1906.

In accordance with other aspects of the invention, extension of clock and power domains on the floorplan are provided and each element is tested to ensure it is located within the bounds of the specified clock and power domain. If the test fails, the element is moved until a suitable location is found where the test is passing. Once a suitable placement has been found for each element, a routing is done of each connection between element. The routing process will find a suitable path for the set of wires making the connections between elements. After routing is done, distance-spanning pipeline elements are inserted on the links if required, using the information provided regarding the capabilities of the technology, based on how long it takes for a signal to cover a 1 mm distance.

In accordance with some aspects and embodiments of the invention, the tool generates one or more computer files describing the generated NoC that includes:

The list of network elements with their configuration: data width, clock domain.

The position of each generated network element on the floorplan.

The set of routes through the network elements implementing the connectivity.

In accordance with the aspects of the invention, a route is an ordered list of network elements, one for each pair of (initiator, target) and one for each pair of (target, initiator). The route represents how traffic between the pairs will flow and through which elements.

In accordance with various aspects of the invention, the tool is used to generate metrics about the generated NoC, such as: histograms of wire length distribution, number of switches, histogram of switch by size.

Referring now to FIG. 20-FIG. 25, in accordance with various aspects of the invention, the tool automatically assigns a clock and a data width to each of the network nodes such that all input constraints are satisfied (performance, physical clock regions, etc.).

In accordance with various aspects of the invention, the tool is capable of selecting the clock and data width from a range of clock speeds and data widths, selected in conformity with the input constraints, for the parameters of the network. As such, automatic selection includes machine learning models that use feedback to improve the selection by artificial intelligence.

Various inputs 2000 are provided to the tool's checker 2010. The checker 2010 determines if the current configuration is legal at step 2020. The analysis performed by the checker is outline herein and includes review of the constraints and parameters to ensure the configuration is legal.

The performance scenarios are given at a transaction level (i.e. high level communication speeds between components). The process converts them automatically to bandwidth requirements on each network segment. For example, in accordance with various aspects of the invention, the tool machine learning models can identify the bandwidth requirements and receive feedback to improve the automatic selection. In accordance with various aspects of the invention, the tool includes a constraint solver 2110, which is leveraged to produce a configuration that is optimal following one or more of the following parameters or criteria:

1) Cost (wires, energy)
2) Number of adapters (clock domain crossings, packet width adapters, etc.)

In accordance with various aspects of the invention, the tool includes a process that checks whether an existing NoC topology is able to accommodate the given high-level transaction scenarios, by verifying that the current configuration is legal at step 2020. In accordance with various aspects of the invention, if the performance check fails, the segments that do not have enough bandwidth are highlighted for the designer or user to take action. The information gathered from the performance check can also be provided to a machine learning model as feedback to an artificial intelligence (AI) machine that is implemented as part of the tool.

In accordance with various aspects of the invention, the tool receives as input high-level specification of the transactions that make up one running an application (scenario) to ensure that each application can individually run at the required speed.

Figures 22, 23:
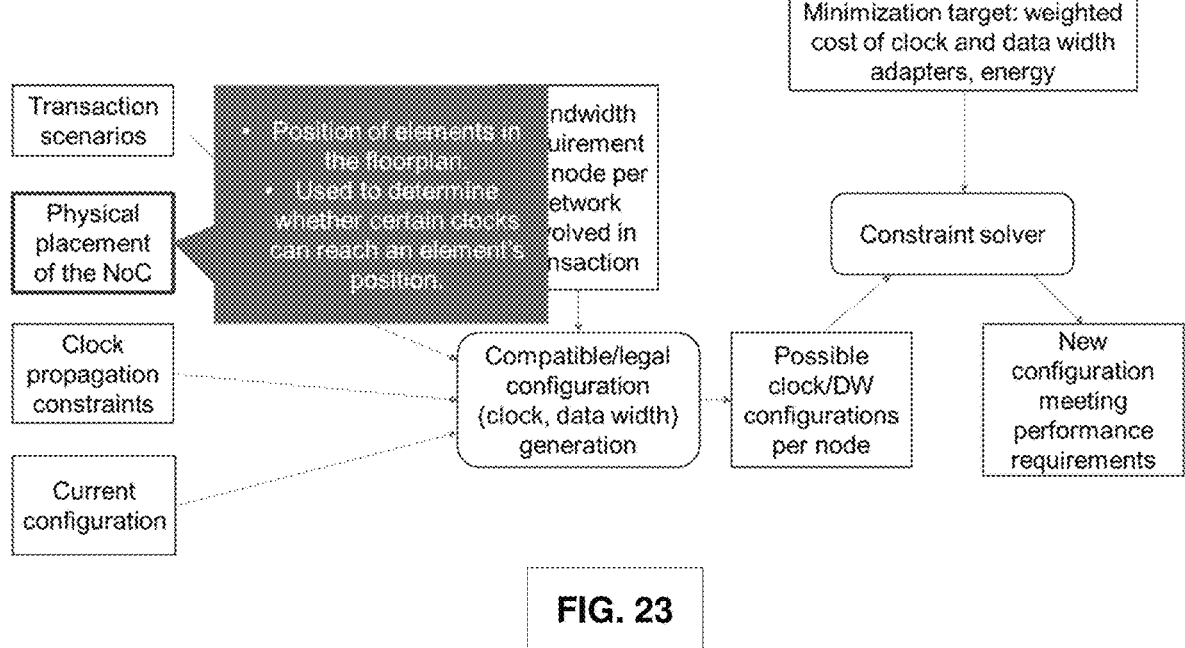
FIG. 22 illustrates a table with various scenarios for connectivity using a NoC in accordance with the various aspects and embodiments of the present invention.
FIG. 23 illustrates a process with physical placement inputs to a design tool in accordance with the various aspects and embodiments of the present invention.
Figure 24:
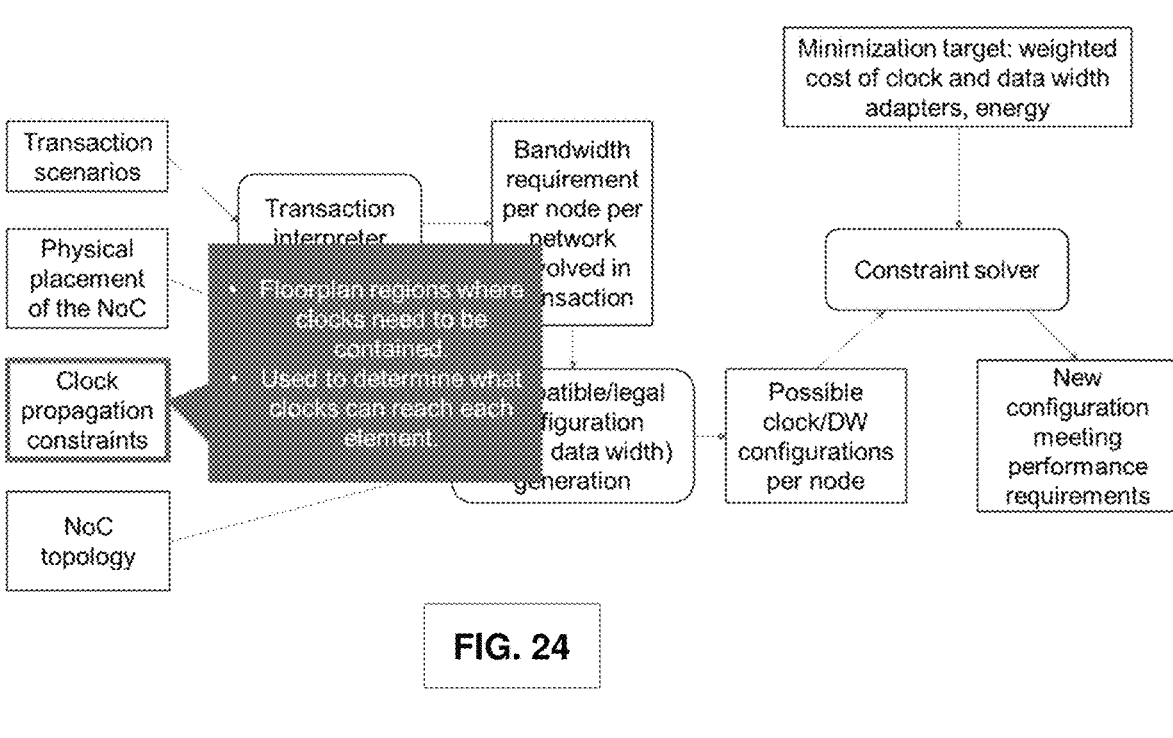
FIG. 24 illustrates a process with clock constraint inputs to a design tool in accordance with the various aspects and embodiments of the present invention.
Figure 25:
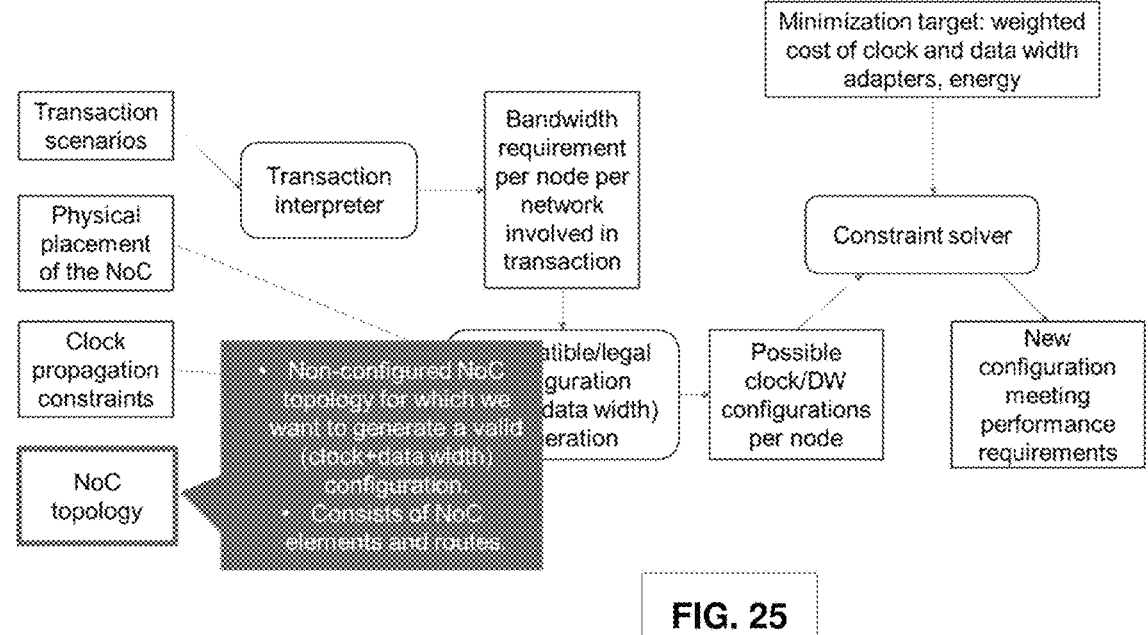
FIG. 25 illustrates a process with inputs to a design tool in accordance with the various aspects and embodiments of the present invention.

Referring specifically to FIG. 22, in accordance with various aspects of the invention, the tool interpret scenarios, for example those shown. From the high-level transactions found in scenarios, the tool deduces the actual amount of bandwidth that is needed at each element, of each involved network. In accordance with various aspects of the invention, the tool receives a transaction that can be multi-phase and can consume control and/or data BW in multiple networks. In accordance with various aspects of the invention and as a non-limiting example, a READ transaction in a non-coherent scenario generates a request (usually 1 but could also be multiple cycles) in the request network, and multiple data in the response network (multiple cycles). In accordance with various aspects of the invention, for each transaction, the list of networks that are impacted is inferred automatically and bandwidth requirements of each network components (nodes and segments) are generated accordingly. In accordance with various aspects of the invention, the tool performs legal configuration generation. Thus, for each node, given the bandwidth requirement, current placement, clock physical restrictions, the tool:

1) Deduce possible configurations (clock+data width) that can be applied to the node; and
2) Expressed as a set of constraints, instead of an exhaustive list.

In accordance with various aspects of the invention, the tool selects an optimal configuration. The tool uses a constraint solver when seeking the optimal legal configuration. The constraint solver is used to minimize the cost using a heuristic that takes as input, including and not limited to, at least one or more:

Cost of clock adapters (clock domain changes between two nodes, for instance) to minimize area;

Wire length (prefer lower data widths);

Energy consumption (selecting slower clocks when legal); and

Technological parameters,

In accordance with various aspects of the invention, the tool turns a high-level transaction speed requirement into bandwidth annotations for segments in several networks of the NoC. In accordance with various aspects of the invention, the tool takes clock tree propagation constraints (floorplan region where a given clock can reside) into account to filter out illegal configurations. In accordance with various aspects of the invention, the tool uses a constraint solver to optimize not only the wire cost and performance, but also to reduce the number of required adapters, including for clock domain crossings.

Referring specifically to FIG. 26-FIG. 29, In accordance with various aspects of the invention, the tool includes a process wherein the elements of a newly created NoC (generated by topology synthesis or created by hand) are configured, which includes clock assignment and data width allocation, to meet a performance target, provided by a user in the form of a set of performance scenarios.

Figure 26:
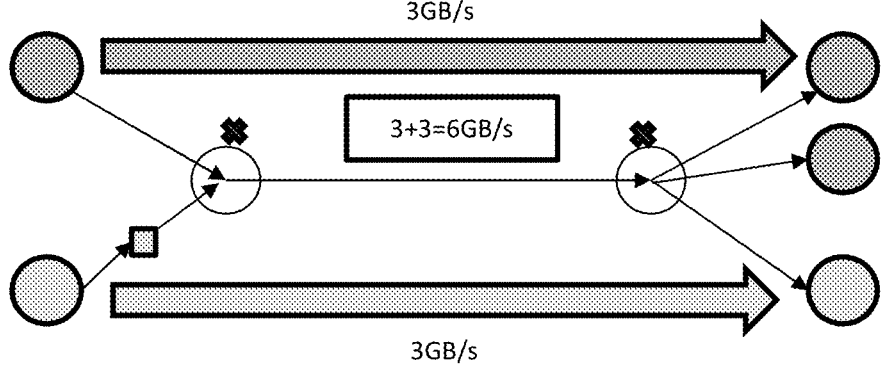
FIG. 26 illustrates part of a NoC topology between IP blocks that share a segment.

Referring to FIG. 26, the scenario depicted in the figure would require the middle segment to sustain a bandwidth of 6 GB/s, which cannot be achieved even by assigning the two switches to the fastest clock in the design. The tool provides an incremental topology synthesis process, wherein the user is allowed to provide performance requirements late in the design flow, after a topology has already been created. To achieve this, the tool includes a method for transforming an existing topology to satisfy newly added bandwidth requirements.

In accordance with various aspects of the invention, the tool identifies segments that cannot satisfy bandwidth requirements. A segment is defined as a section between two switches and a segment may already have several channels that include different communications. For each such segment, the tool creates additional channels for the segment. In accordance with various aspects of the invention, the tool takes a conservative number of channels, e.g. one channel per communication going through the segment. The tool optimally distribute the communications going through the segment (routes) on the new channels, such that:

Each channel groups as many communications as possible and uses as much of its bandwidth as possible;

Every performance scenario is satisfied with the current route distribution; and The new grouping of routes does not introduce new deadlocks (through the merging of routes that were previously separated into different existing channels).

Figure 27:
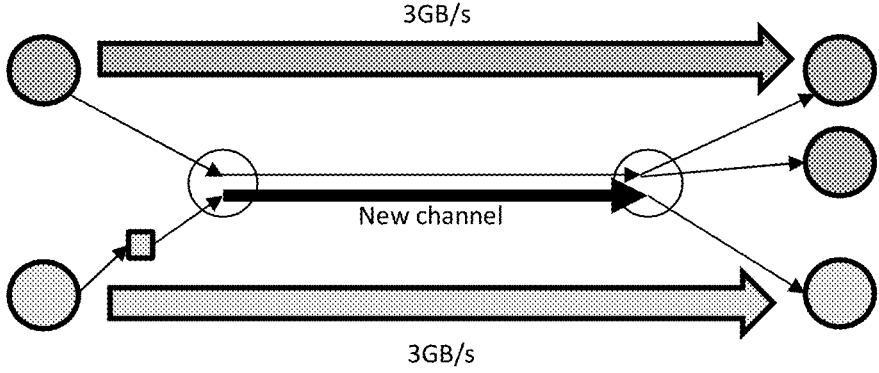
FIG. 27 illustrates a step in the process of changing the shared segment of FIG. 20 in accordance with the various aspects and embodiments of the present invention.
Figure 28:
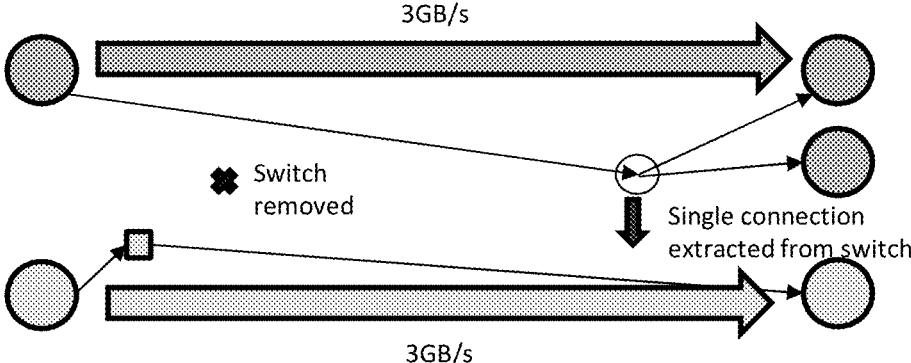
FIG. 28 illustrates a step in the process of changing the shared segment of FIG. 20 in accordance with the various aspects and embodiments of the present invention.

Referring specifically to FIG. 27, in accordance with various aspects of the invention, the tool generates the route redistribution shown. Thus, when routes are redistributed on all of the segments in violation, the internal arbiters of switches are changed, sometimes removing the need for maintaining a switch. Referring specifically to FIG. 28, the tool detects the true arbiters inside of the remaining switches, and either split the switches that have multiple disjoint arbiters, or delete the switches that no longer have arbiters.

Figure 29:
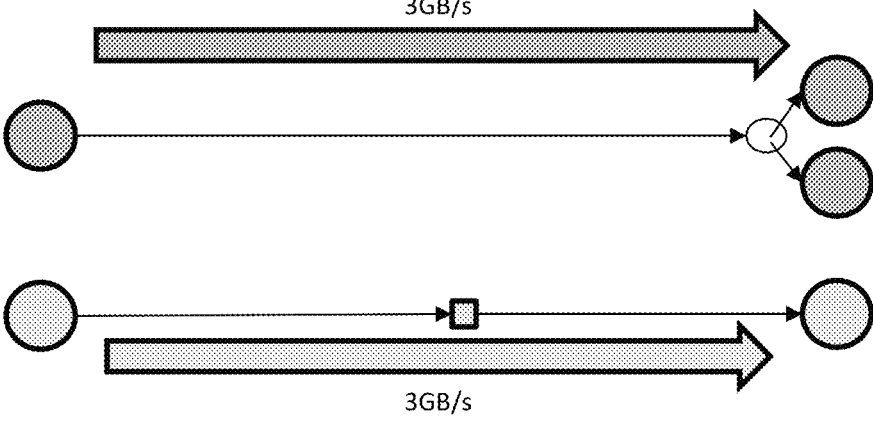
FIG. 29 illustrates a step in the process of changing the shared segment of FIG. 20 in accordance with the various aspects and embodiments of the present invention.

Since the shape of the topology has changed due to the addition of new channels and the deletion/splitting of switches, the current physical placement can no longer be considered optimal. In accordance with various aspects of the invention, the tool invokes global placement to find a suitable placement for the newly modified topology. In the non-limiting example provided, the new placement is shown in FIG. 29.

In accordance with various aspects of the invention, the tool uses the configuration process, as outlined herein, in order to configure the remaining switches. With the newly created channels, a valid configuration is guaranteed to be found, as long as the scenarios provided by the user are valid.

In accordance with various aspects of the invention, the tool can incrementally add new channels to the topology (after the initial topology synthesis) to sustain the specified bandwidth scenarios. In accordance with various aspects of the invention, the tool can redistribute routes on the new channels so as to minimize the number of required channels without introducing new deadlocks. In accordance with various aspects of the invention, the tool can split and delete the switches that are no longer serving an arbitration purpose following the route redistribution. In accordance with various aspects of the invention, the tool can re-invoke the data width and clock configuration process and adjust as needed. In accordance with various aspects of the invention, the tool adjusts placement globally on the floorplan. In accordance with various aspects of the invention, the tool includes a machine learning model that can receive feedback that is used to further train the model.

In accordance with various aspects of the invention, the tool includes a topology synthesis process wherein the topology is initially created by ignoring the provided performance scenarios and focusing on optimizing the wire cost, to which the tool applies the above topology transformation process to support the performance scenarios in a second phase. This speeds up the NoC generation or topology synthesis process by accounting for one requirement at a time. Moreover, by first focusing on optimizing wire routes and global length, the tool ensure that any segments that could potentially be merged have already been merged by the initial synthesis, and only paths requiring more bandwidth are duplicated in the end.

Referring specifically to FIG. 30-FIG. 33, In accordance with various aspects of the invention, the tool allows a user to provide performance requirements for the topology synthesis process by defining a set of scenarios, wherein a scenario is a set of communications taking place in parallel at a given speed. While this makes it possible to drive the shape of the topology using performance constraints, it can be difficult and time-consuming to define and input all of the scenarios that are required to obtain a certain traffic distribution. To alleviate this, the tool introduces a new process that allows a user to select a traffic pattern from a list of pre-defined patterns and apply it on a set of connections. The tool then generates the required set of scenarios automatically based on connectivity requirements of initiators to targets and constraints of the network for traffic patterns selected from a list of pre-defined traffic patterns. In accordance with various aspects of the invention, the user provides or creates a traffic class for a set of connections and select a traffic pattern for the traffic class, from a list of pre-defined traffic patterns. The tool generates, for each traffic class with a traffic pattern, all of the scenarios from the set of connections included in the traffic class.

Figure 30:
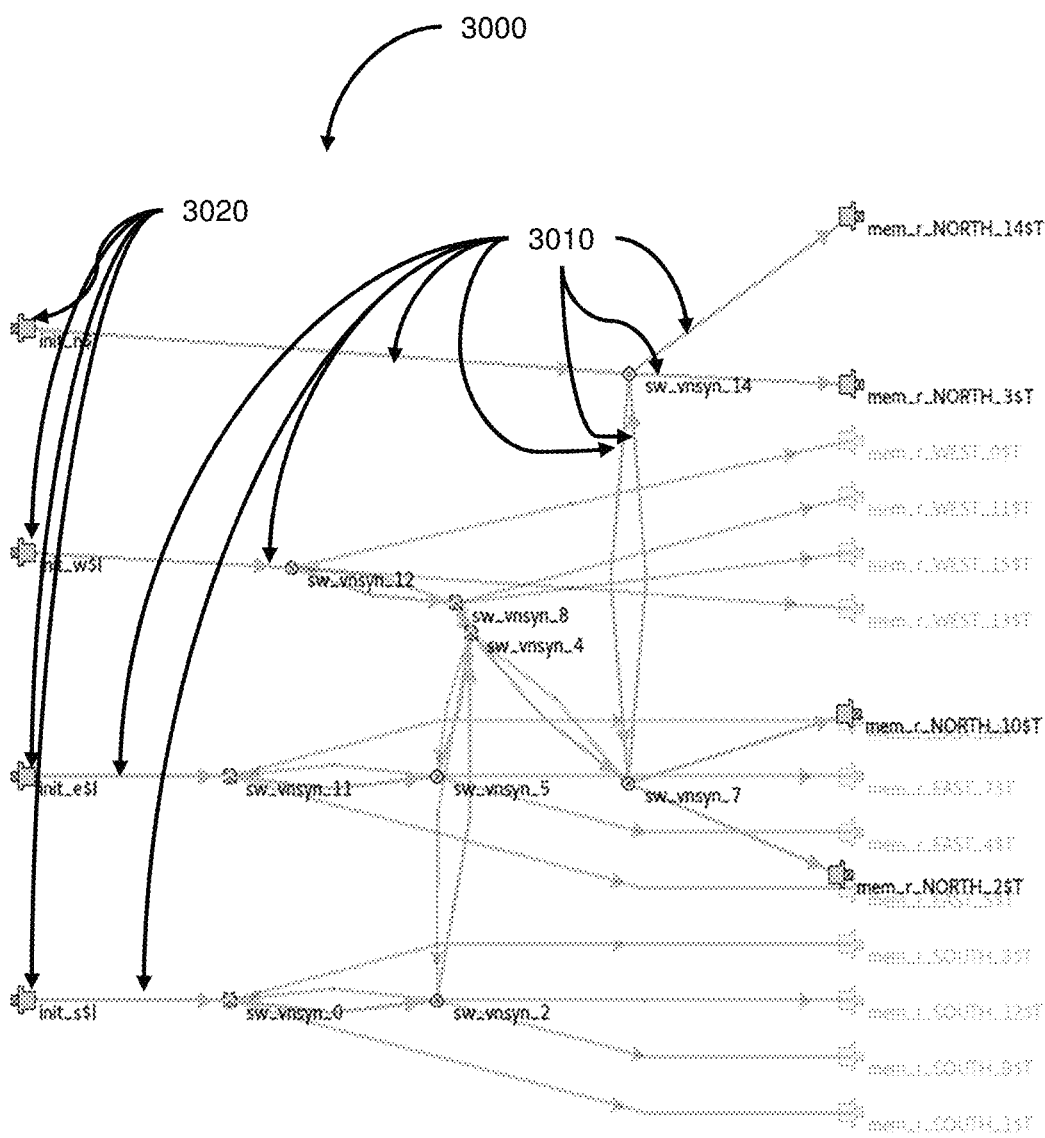
FIG. 30 illustrates a NoC topology with segments that are shared among several initiators to reduce wire cost.

An example topology is show in FIG. 30. A topology 3000 is shown that includes segments 3010 shared among several initiators 3020 to reduce wire cost. In one non-limiting example, the user wishes to ensure that the selected initiators 3020 and targets are able to communicate at full available bandwidth simultaneously, which is equivalent, in terms of bandwidth, to having a central crossbar.

Figure 31:
FIG. 31 illustrates a graphical user interface of a topology generation tool with segments that are shared created and labeled in accordance with the various aspects and embodiments of the invention.
Figure 32:
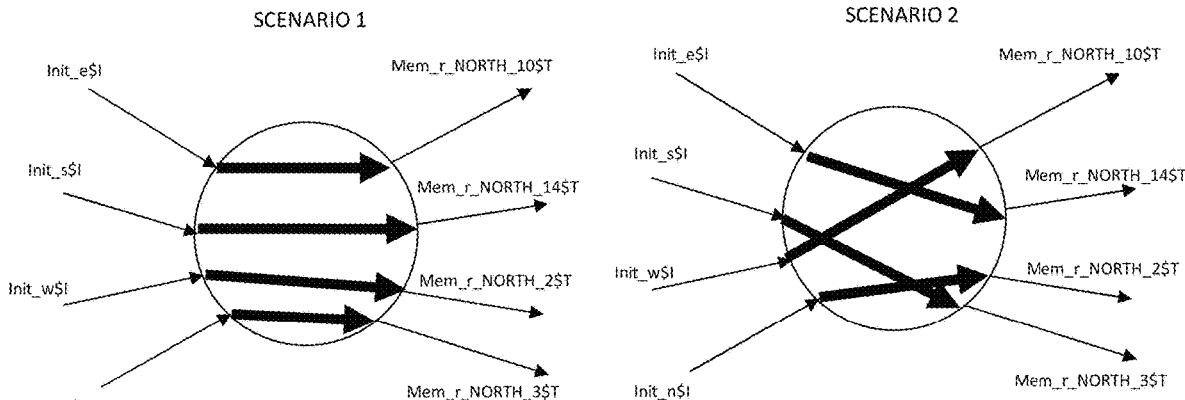
FIG. 32 illustrates possible scenarios for the NoC that is used by the topology generation tool in accordance with the various aspects and embodiments of the invention.

Referring specifically to FIG. 31, a screenshot of a table 3100 is shown, wherein the user can simply define a traffic class for these connections. A new traffic class named "CROSSBAR" 3110 is created and set to use the "Preserve Bandwidth" traffic pattern, which ensures that the bandwidth is equivalent to that of a full crossbar. In accordance with some aspects of the invention, the name assigned to the new traffic class may be any name is the defined by the user. In accordance with various aspects of the invention, the tool then automatically uses this input, which is the traffic class and the bandwidth, to generate a set of scenarios. In accordance with some aspects of the invention, the tool uses a machine learning model to generate the set of scenarios. Each possible simulation and simultaneous set of communications is considered as a separate scenario, in which each active input/output pair in the "virtual" crossbar communicates at maximum bandwidth, as shown in FIG. 32. While there are many different possible scenarios, with these scenarios defined, the tool performs a topology synthesis process and the tool is able to incrementally modify the topology to sustain the required bandwidth based on the specific scenario, such as scenario 1 or scenario The tool makes changes to the network as needed in order to attain the performance requirements defined.

Figure 33:
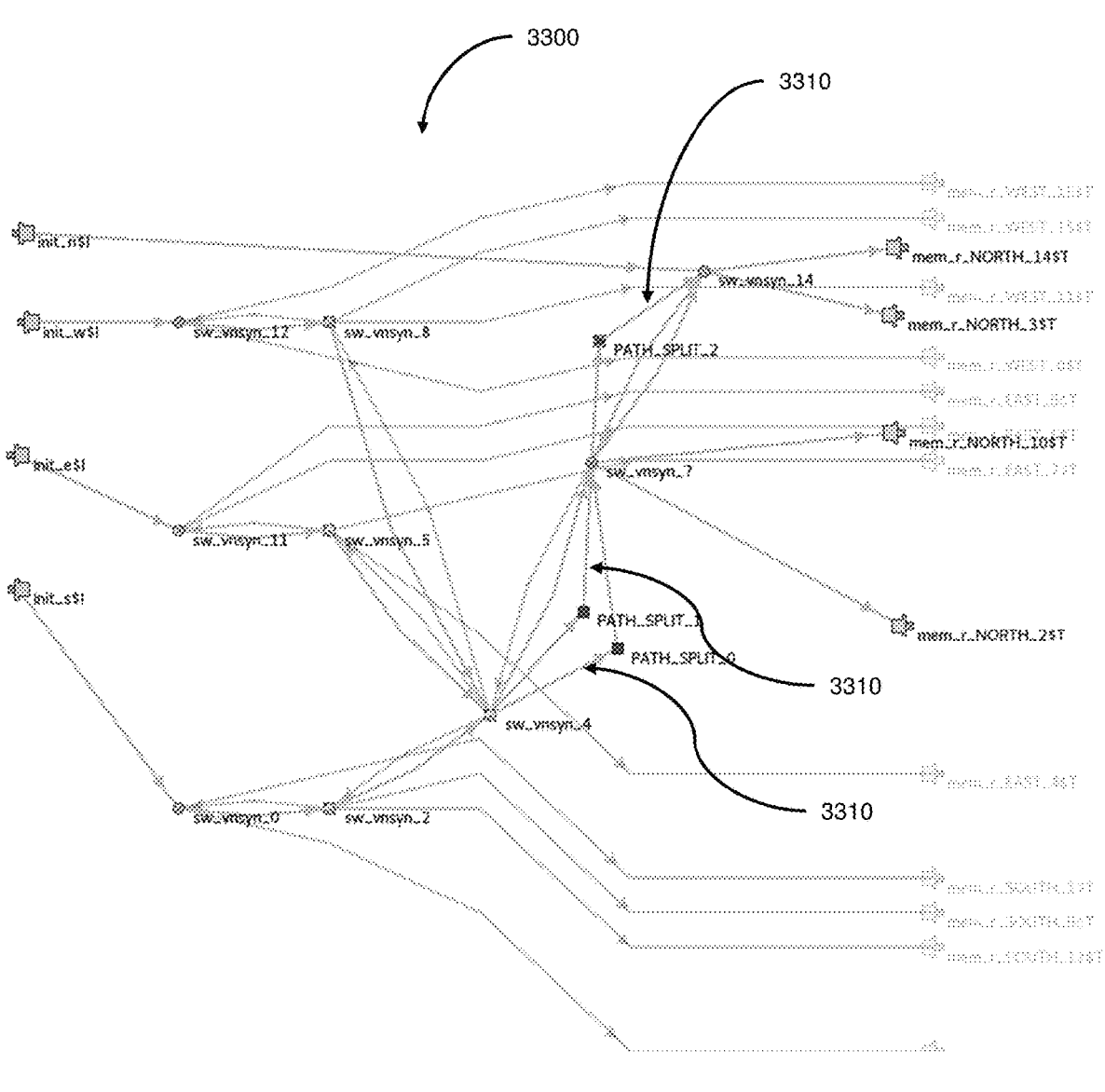
FIG. 33 illustrates new channels created in topology of the NoC by the topology generation tool in accordance with the various aspects and embodiments of the invention.

FIG. 33 shows a topology 3300 that represents the topology 3000 and includes channels 3310 to modify certain segments that were previously shared. In accordance with various aspects of the invention, the tool creates the channels 3310 in segments that were previously shared. The channels 3310 are inserted to address performance needs identified by the tool and, hence, maximize performance of the network using additional channels. In accordance with various aspects of the invention, the tool can apply this process to any collection of traffic patterns, not just the crossbar example. In accordance with various aspects of the invention, the tool can receive feedback, either from the user or as input from an adversarial machine learn model, that is used to further train the tool's machine learning model.

In accordance with another aspect of the invention, the tool automatically inserts in the network various adapters and buffers. The tool inserts the adapters based on the adaptation required between two elements that have different data width, different clock and power domains. The tool inserts the buffers based on the scenarios and the detected rate mismatch.

In accordance with some aspects and embodiments, the tool can be used to ensure multiple iterations of the synthesis are done for incremental optimization of the NoC, which includes a situation when one constraint provided to the tool is information about the previous run.

After execution of the synthesis process by the software, the results are produced in a machine-readable form, such as computer files using a well-defined format to capture information. An example of such a format is XML, another example of such a format is JSON. The scope of the invention is not limited by the specific format.

Some aspects of the invention employ an incremental approach to network synthesis. This incremental approach is useful in numerous contexts. For instance, in some embodiments, the incremental process begins from a specification and a clean floorplan. In these and other embodiments, some of which were discussed above, In accordance with some aspects and embodiments, connections can have a communication policy, which specifies, for example, a connection's sensitivity to latency.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code including instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example, and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WIFI, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media including any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. A tool for generation of a network-on-chip (NoC) topology using performance constraints, wherein the tool includes a non-transitory computer readable medium for storing code, which when executed by one or more processors, would cause the tool to:

receive a traffic classification identified for a plurality of connections between initiators and targets;

receive a set of traffic patterns selected from a plurality of pre-defined traffic patterns;

analyze a set of connections between the initiators and the targets to generate a plurality of scenarios based on the set of connections included in the traffic classification; and use the plurality of scenarios to alter the NoC with each of the plurality of scenarios in order to incrementally modify the NoC while sustaining the performance constraints.

2. The tool of claim 1, wherein the plurality of pre-defined traffic patterns are generated by the tool based on the traffic classification and initiator-to-target pair.

3. The tool of claim 1 is further caused to modify at least one segment of at least one connection selected from the set of connections to include to generate a parallel communication path.

4. The tool of claim 1, wherein the set of connections include performance requirements for each connection.

5. The tool of claim 1, wherein performance constraints include clock requirements and bandwidth requirements.

6. The tool of claim 1, wherein the tool is caused to:

identify a least one channel that is placed in at least one segment; and modify, incrementally, the NoC using the at least one channel thereby resulting in a legal configuration for the NoC that meets performance requirements.

\* \* \* \* \*